(12) United States Patent
Tanaka

(10) Patent No.: US 10,621,465 B2
(45) Date of Patent: Apr. 14, 2020

(54) APPARATUS, METHOD FOR CHARACTER RECOGNITION, AND NON-TRANSITORY COMPUTER-READABLE STORAGE MEDIUM

(71) Applicant: FUJITSU LIMITED, Kawasaki-shi, Kanagawa (JP)

(72) Inventor: Hiroshi Tanaka, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 15/720,142

(22) Filed: Sep. 29, 2017

(65) Prior Publication Data

US 2018/0114088 A1 Apr. 26, 2018

(30) Foreign Application Priority Data

Oct. 24, 2016 (JP) ................................ 2016-208198

(51) Int. Cl.
*G06K 9/00* (2006.01)
*G06K 9/46* (2006.01)
(Continued)

(52) U.S. Cl.
CPC ....... *G06K 9/4647* (2013.01); *G06F 16/9577* (2019.01); *G06K 9/344* (2013.01); *G06K 9/348* (2013.01); *G06K 2209/01* (2013.01)

(58) Field of Classification Search
None
See application file for complete search history.

(56) References Cited

U.S. PATENT DOCUMENTS

| 5,867,277 A * | 2/1999 | Melen | G06K 9/346 358/296 |
| 2005/0251015 A1* | 11/2005 | Takikawa | G06T 3/40 600/407 |

(Continued)

FOREIGN PATENT DOCUMENTS

| JP | 2008-070831 | 3/2008 |
| JP | 2008219794 A * | 9/2008 |

(Continued)

OTHER PUBLICATIONS

Tanaka et al., "Automatic Detection of Cross-Browser Presentation Incompatibilities based on the Comparisons of HTML Element Relationships and OCR Results", IEICE Technical Report BioX2015-46, PRMU2015-169 (Mar. 2016), pp. 31-36, w/English abstract and translation (30 pages total).

*Primary Examiner* — Feng Niu
(74) *Attorney, Agent, or Firm* — Fujitsu Patent Center

(57) ABSTRACT

An apparatus for character recognition executes a first process for acquiring first image data which is an image in which string data containing one or more characters is drawn at a first magnification through a drawing process that outputs image data acquired by drawing characters at a display magnification, executes a second process for acquiring second image data which is an image in which the string data is drawn at a second magnification larger than the first magnification through the drawing process, executes a third process for acquiring a recognition result including a character code of each of the characters in the string data drawn in the second image data through a character recognition process, and executes a fourth process for adjusting a newline position of the recognition result acquired from the second image data by using a newline position of the string data drawn in the first image data.

17 Claims, 28 Drawing Sheets

(51) Int. Cl.
    *G06F 16/957*     (2019.01)
    *G06K 9/34*     (2006.01)

(56) References Cited

U.S. PATENT DOCUMENTS

| | | | |
|---|---|---|---|
| 2008/0092040 A1 | 4/2008 | Nakamura | |
| 2014/0078181 A1* | 3/2014 | Harada | G09G 5/373 345/661 |
| 2014/0347367 A1* | 11/2014 | Mayumi | G06F 3/048 345/467 |
| 2015/0227827 A1* | 8/2015 | Sakurai | G06F 3/147 235/494 |
| 2016/0162162 A1* | 6/2016 | Liu | G06F 17/24 715/802 |

FOREIGN PATENT DOCUMENTS

| | | |
|---|---|---|
| JP | 2010-039815 | 2/2010 |
| JP | 2015-170979 | 9/2015 |
| JP | 2016-099793 | 5/2016 |

\* cited by examiner

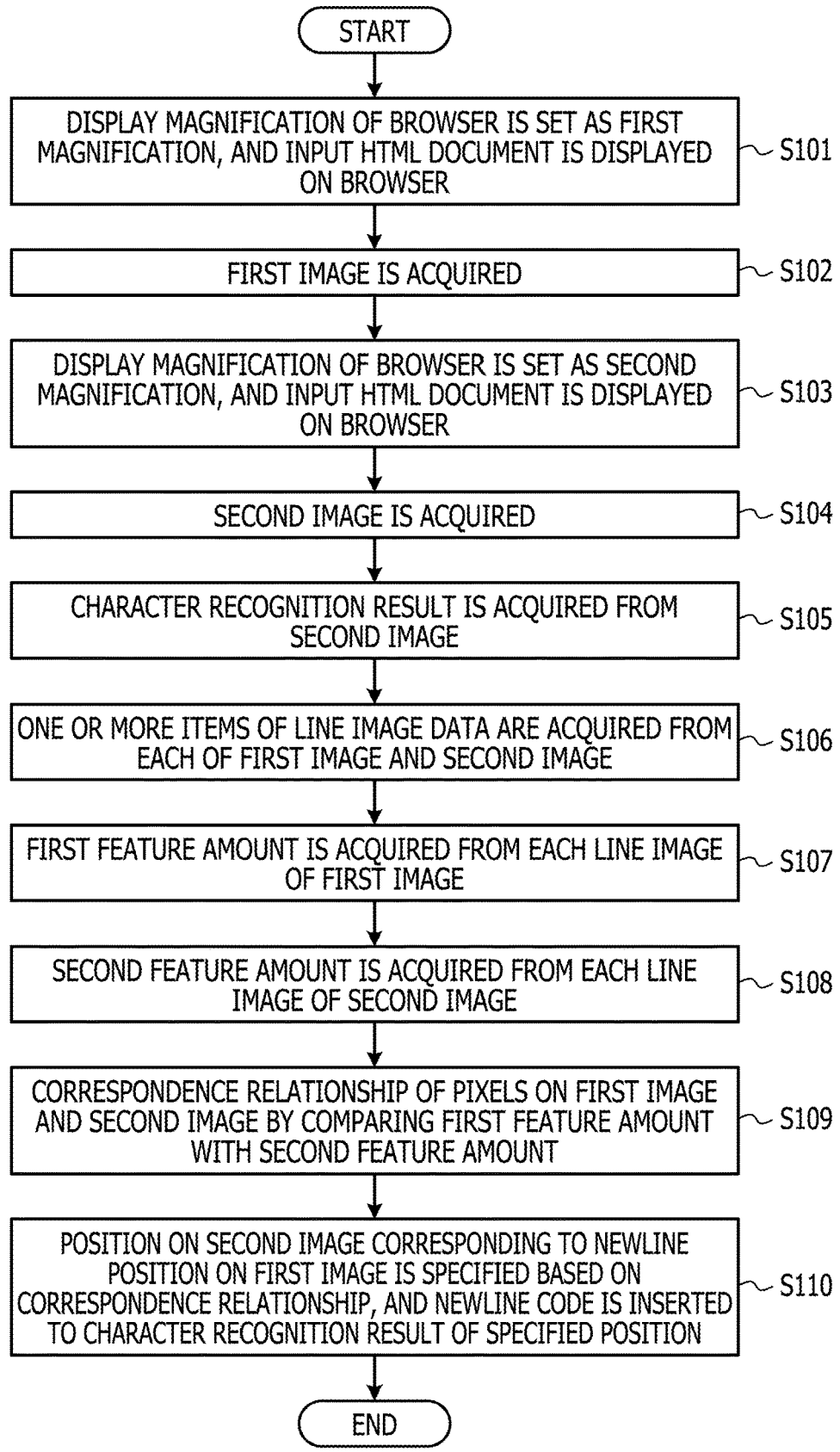

FIG. 9

| T10 | | | |
|---|---|---|---|
| | colspan: RECOGNITION RESULT INFORMATION | | |
| T11 | ELEMENT NUMBER | | 7 |
| T12 | CHARACTER ELEMENTS [1] | | |
| | | CHARACTER CODE (ASC II) | 0x41 |
| | | CHARACTER FRAME INFORMATION | |
| | | CHARACTER FRAME POSITION | (x1, y1) |
| | | WIDTH | w1 |
| | | HEIGHT | h1 |
| T13 | CHARACTER ELEMENTS [2] | | |
| | | CHARACTER CODE (ASC II) | 2 |
| | | CHARACTER FRAME INFORMATION | |
| | | CHARACTER FRAME POSITION | (x2, y2) |
| | | WIDTH | w1 |
| | | HEIGHT | h1 |
| T14 | CHARACTER ELEMENTS [3] | | |
| | | CHARACTER CODE (ASC II) | 0x43 |
| | | CHARACTER FRAME INFORMATION | |
| | | CHARACTER FRAME POSITION | (x3, y3) |
| | | WIDTH | w1 |
| | | HEIGHT | h1 |
| T15 | CHARACTER ELEMENTS [4] | | |
| | | CHARACTER CODE (ASC II) | 0x44 |
| | | CHARACTER FRAME INFORMATION | |
| | | CHARACTER FRAME POSITION | (x4, y4) |
| | | WIDTH | w1 |
| | | HEIGHT | h1 |
| T16 | CHARACTER ELEMENTS [5] | | |
| | | CHARACTER CODE (ASC II) | 0x0A |
| | | CHARACTER FRAME INFORMATION | |
| | | CHARACTER FRAME POSITION | 0 |
| | | WIDTH | 0 |
| | | HEIGHT | 0 |
| T17 | CHARACTER ELEMENTS [6] | | |
| | | CHARACTER CODE (ASC II) | 0x45 |
| | | CHARACTER FRAME INFORMATION | |
| | | CHARACTER FRAME POSITION | (x6, y6) |
| | | WIDTH | w6 |
| | | HEIGHT | h6 |
| T18 | CHARACTER ELEMENTS [7] | | |
| | | CHARACTER CODE (ASC II) | 0x46 |
| | | CHARACTER FRAME INFORMATION | |
| | | CHARACTER FRAME POSITION | (x7, y7) |
| | | WIDTH | w7 |
| | | HEIGHT | h7 |

FIG. 11

| LINE AREA INFORMATION | | |
|---|---|---|
| ELEMENT NUMBER | | 2 |
| LINE ELEMENT [1] | | |
| | UPPER END Y COORDINATE VALUE | Line_y1 |
| | HEIGHT | Line_h1 |
| LINE ELEMENT [2] | | |
| | UPPER END Y COORDINATE VALUE | Line_y2 |
| | HEIGHT | Line_h2 |

T40
T41 — ELEMENT NUMBER
T42 — LINE ELEMENT [1]
T421 — UPPER END Y COORDINATE VALUE
T422 — HEIGHT
T43 — LINE ELEMENT [2]

FIG. 13

| FIRST FEATURE AMOUNT INFORMATION | |
|---|---|
| ELEMENT NUMBER | 2 |
| LINE ELEMENT [1] | |
| X-AXIS COORDINATE [1] | FEATURE AMOUNT [1] |
| X-AXIS COORDINATE [2] | FEATURE AMOUNT [2] |
| X-AXIS COORDINATE [3] | FEATURE AMOUNT [3] |
| ⋮ | ⋮ |
| X-AXIS COORDINATE [N] | FEATURE AMOUNT [N] |
| LINE ELEMENT [2] | |
| X-AXIS COORDINATE [1] | FEATURE AMOUNT [1] |
| X-AXIS COORDINATE [2] | FEATURE AMOUNT [2] |
| X-AXIS COORDINATE [3] | FEATURE AMOUNT [3] |
| ⋮ | ⋮ |
| X-AXIS COORDINATE [N] | FEATURE AMOUNT [N] |

FIG. 15

| | FIRST FEATURE AMOUNT INFORMATION | | | | |
|---|---|---|---|---|---|
| T31 | ELEMENT NUMBER | 2 | | | |
| T32 | LINE ELEMENT [1] | | | | |
| | | X-AXIS COORDINATE [1] | FEATURE AMOUNT A [1] | FEATURE AMOUNT B [1] | FEATURE AMOUNT C [1] | FEATURE AMOUNT D [1] |
| | | X-AXIS COORDINATE [2] | FEATURE AMOUNT A [2] | FEATURE AMOUNT B [2] | FEATURE AMOUNT C [2] | FEATURE AMOUNT D [2] |
| | | X-AXIS COORDINATE [3] | FEATURE AMOUNT A [3] | FEATURE AMOUNT B [3] | FEATURE AMOUNT C [3] | FEATURE AMOUNT D [3] |
| | | ... | ... | ... | ... | ... |
| | | X-AXIS COORDINATE [N] | FEATURE AMOUNT A [N] | FEATURE AMOUNT B [N] | FEATURE AMOUNT C [N] | FEATURE AMOUNT D [N] |
| T33 | LINE ELEMENT [2] | | | | |
| | | X-AXIS COORDINATE [1] | FEATURE AMOUNT A [1] | FEATURE AMOUNT B [1] | FEATURE AMOUNT C [1] | FEATURE AMOUNT D [1] |
| | | X-AXIS COORDINATE [2] | FEATURE AMOUNT A [2] | FEATURE AMOUNT B [2] | FEATURE AMOUNT C [2] | FEATURE AMOUNT D [2] |
| | | X-AXIS COORDINATE [3] | FEATURE AMOUNT A [3] | FEATURE AMOUNT B [3] | FEATURE AMOUNT C [3] | FEATURE AMOUNT D [3] |
| | | ... | ... | ... | ... | ... |
| | | X-AXIS COORDINATE [N] | FEATURE AMOUNT A [N] | FEATURE AMOUNT B [N] | FEATURE AMOUNT C [N] | FEATURE AMOUNT D [N] |

| T10 ↘ | RECOGNITION RESULT INFORMATION | |
|---|---|---|
| T11 | ELEMENT NUMBER | 7 |
| T12 | CHARACTER ELEMENTS [1] | |
| | CHARACTER CODE (ASC II) | 0x41 |
| | CHARACTER FRAME INFORMATION | |
| | CHARACTER FRAME POSITION | (x1, y1) |
| | WIDTH | w1 |
| | HEIGHT | h1 |
| T13 | CHARACTER ELEMENTS [2] | |
| | CHARACTER CODE (ASC II) | 2 |
| | CHARACTER FRAME INFORMATION | |
| | CHARACTER FRAME POSITION | (x2, y2) |
| | WIDTH | w1 |
| | HEIGHT | h1 |
| T14 | CHARACTER ELEMENTS [3] | |
| | CHARACTER CODE (ASC II) | 0x43 |
| | CHARACTER FRAME INFORMATION | |
| | CHARACTER FRAME POSITION | (x3, y3) |
| | WIDTH | w1 |
| | HEIGHT | h1 |
| T15a | CHARACTER ELEMENTS [4] | |
| | CHARACTER CODE (ASC II) | 0x0A |
| | CHARACTER FRAME INFORMATION | |
| | CHARACTER FRAME POSITION | 0 |
| | WIDTH | 0 |
| | HEIGHT | 0 |
| T16a | CHARACTER ELEMENTS [5] | |
| | CHARACTER CODE (ASC II) | 0x44 |
| | CHARACTER FRAME INFORMATION | |
| | CHARACTER FRAME POSITION | (x4, y4) |
| | WIDTH | w4 |
| | HEIGHT | h4 |
| T17 | CHARACTER ELEMENTS [6] | |
| | CHARACTER CODE (ASC II) | 0x45 |
| | CHARACTER FRAME INFORMATION | |
| | CHARACTER FRAME POSITION | (x6, y6) |
| | WIDTH | w6 |
| | HEIGHT | h6 |
| T18 | CHARACTER ELEMENTS [7] | |
| | CHARACTER CODE (ASC II) | 0x46 |
| | CHARACTER FRAME INFORMATION | |
| | CHARACTER FRAME POSITION | (x7, y7) |
| | WIDTH | w7 |
| | HEIGHT | h7 |

APPARATUS, METHOD FOR CHARACTER RECOGNITION, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-208198, filed on Oct. 24, 2016, the entire contents of which are incorporated herein by reference.

FIELD

The embodiment discussed herein is related to an apparatus for character recognition, a method for character recognition, and a non-transitory computer-readable storage medium for storing a program for character recognition.

BACKGROUND

With the spread of the Internet, the types of Web browsers for displaying HTML documents acquired via the Internet are increasing. In addition to the types of Web browsers, there are many combinations in consideration of the difference between the version of Web browser and an operating system (OS).

However, the Web browsers have different drawing properties from each other, and have their own expansion function respectively. In addition, regarding HTML, there is a definition having different interpretation for each Web browser. As a result, a display result of an HTML document is different for each Web browser.

Here, a technique of determining whether or not to be the difference of the display result of the HTML document for each Web browser by specifying a display area of each HTML element in the display result of the HTML document for each Web browser and comparing display areas with each other, each of which is specified for each Web browser has been discussed.

Further, a technique of acquiring a partial image cut out from an area, among the display areas on the Web browser, corresponding to the HTML element having a text attribute by using a screen capture function, and then verifying whether or not there are defects on the display such as garbled characters by using the results of character recognition for the partial image has been proposed.

Note that, there is a technique of performing various types of processes by extracting an element having a text attribute from a document image in which a composite document such as an HTML document having images and text mixed is drawn.

Examples of the related art include Japanese Laid-open Patent Publication No. 2010-39815, Japanese Laid-open Patent Publication No. 2016-99793, Japanese Laid-open Patent Publication No. 2015-170979, Japanese Laid-open Patent Publication No. 2008-70831, and Hiroshi TANAKA, Yusaku FUJII, and Eigo SEGAWA, "Automatic Detection of Cross-Browser Presentation Incompatibilities based on the Comparisons of HTML Element Relationships and OCR Results" (PRMU2015-169, 2016-03).

SUMMARY

According to an aspect of the invention, an apparatus for character recognition includes: a memory; and a processor coupled to the memory and configured to execute a first image acquiring process that includes acquiring first image data which is an image in which string data containing one or more characters is drawn at a first display magnification through a drawing process that outputs image data acquired by drawing the one or more characters with a font size corresponding to a display magnification, execute a second image acquiring process that includes acquiring second image data which is an image in which the string data is drawn at a second display magnification larger than the first display magnification, execute a recognition result acquiring process that includes acquiring a character recognition result including a character code of each of the one or more characters in the string data drawn in the second image data through a character recognition process that outputs a character code corresponding to each of the one or more characters drawn on the second image data, and execute a newline position determining process that includes adjusting a newline position of the character recognition result acquired from the second image data by using a newline position of the string data drawn in the first image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of the flow of a character recognition process according to Example 1;

FIG. 9 is a diagram illustrating an example of a data structure of recognition result field information;

FIG. 11 is a diagram illustrating an example of a data structure of line area information;

FIG. 13 is a diagram (Part 1) illustrating an example of a data structure of first feature amount information;

FIG. 15 is a diagram (Part 2) illustrating an example of the data structure of the first feature amount information;

FIG. 21 is a diagram illustrating an example of the data structure of recognition result information illustrating a character recognition result after converting a newline position;

DESCRIPTION OF EMBODIMENTS

As described above, a technique of acquiring text data having one or more character codes by extracting an element (string element) having a text attribute from a document displayed on a document browsing software (hereinafter, referred to as a browser) such as a Web browser, and then performing character recognition on a document image containing pixels with which the string element is drawn is useful for various applications. For example, in a cross-browser check for verifying the difference of display results for the browsers, the above-described technique may be used for determination of defects such as garbled characters and layout by comparing items of the text data acquired from the display results of the respective browsers by the character recognition. In addition, for example, when voice synthesis is performed with the text data acquired from the display result of the browser by the character recognition, it is possible to realize a reading service of a document by a computer.

Meanwhile, in a case where a document image is acquired from the display result of the browser by using a screen capture function, there is a problem in that depending on the font size of the character, a resolution is deteriorated, and thus it is not easy to correctly recognize the character. In order to solve this problem, for example, by setting a browser so as to enlarge display magnification, and causing the browser to execute a rendering process by using the data of the font size corresponding to the enlarged display magnification, the resolution of the document image is improved and thereby it is possible to improve the accuracy of the character recognition.

However, when the display magnification of the browser is enlarged, a line returning position (newline position) may be changed in the rendering process due to various circumstances such as the occurrence of deviation in the ratio of dimension of each character to a width of an area in which strings are arranged. Therefore, there is a problem in that a newline code is inserted into the result of character recognition at a position different from the layout of a document designed assuming display with standard display magnification, and thus the accuracy of the character recognition is deteriorated.

In this regard, according to one aspect of the embodiments, it aims to improve the accuracy of the character recognition from the document image acquired by using the screen capture function from the display screen of the browser.

Hereinafter, embodiments will be described with reference to the drawings. The configuration of the embodiment is an example and there is no limitation of the configuration of the embodiment.

Example 1

Figure 1:
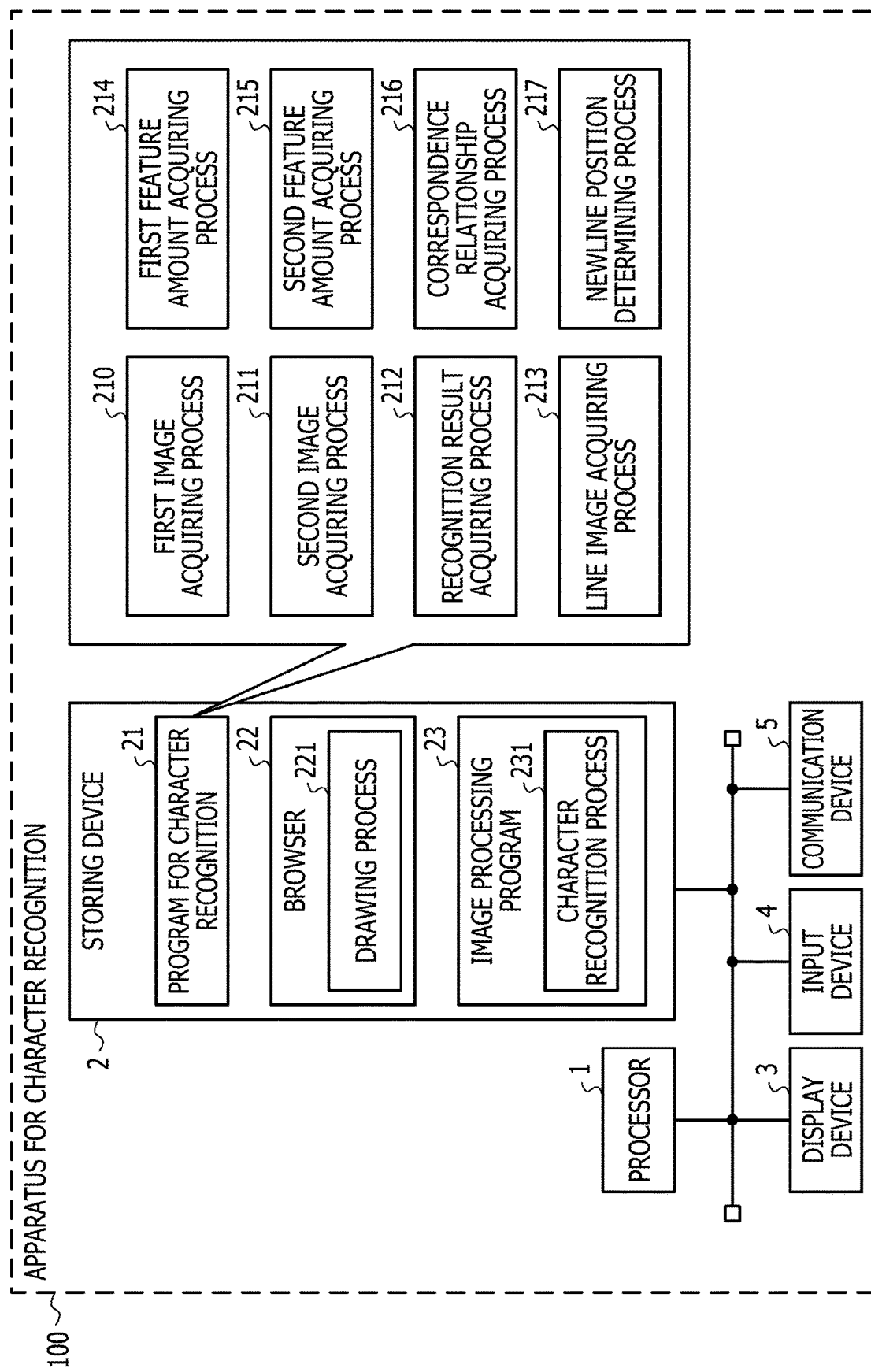
FIG. 1 is a diagram illustrating an example of a configuration of an apparatus for character recognition according to Example 1.

FIG. 1 is a diagram illustrating an example of a configuration of an apparatus for character recognition 100 according to Example 1. The apparatus for character recognition 100 as illustrated in FIG. 1 is provided with a processor 1, a storing device 2, a display device 3, an input device 4, and a communication device 5. The respective devices are communicably connected to each other via wired or wireless communication such as a bus, and may be mounted on one board, or may be separately mounted on a plurality of boards. In addition, the respective devices may be accommodated in one casing, or all or some of the devices may be accommodated in an independent casing.

The processor 1 is an operation apparatus which realizes an operation of the apparatus for character recognition 100 according to Example 1 by executing various kinds of programs such as a program for character recognition 21, a browser 22, and an image processing program 23 which are stored in the storing device 2. Examples of the processor 1 include a central processing unit (CPU), a micro processing unit (MPU), a digital signal processor (DSP) and a field programmable gate array (FPGA). The processor 1 is an example of a processing unit that executes various processes according to Example 1. Note that, the processor 1 may be a multicore processor including two or more cores.

The storing device 2 is a device that stores and holds the various kinds of programs such as the program for character recognition 21, the browser 22, and the image processing program 23 which are executed by the processor 1, and data which is referred to or written when the programs executed by the processor 1, and is configured to include one or both of a nonvolatile storing device and a volatile storing device. Examples thereof include a random access memory (RAM), a read only memory (ROM), a solid state drive (SSD), and a hard disk drive (HDD). In Example 1, the storing device 2 is a generic name of various kinds of storing devices such as a main storing device and a sub-storing device.

The display device 3 is configured to display process results or the like of the program for character recognition 21 executed by the processor 1. Examples thereof include a liquid crystal display (LCD), an organic electro luminescence (OEL) display, and an organic light emitting diode (OLED) display.

The input device 4 is configured to output an input signal in accordance with an input operation by a user to the processor 1. Examples of the input device 4 include a touch pad which is capable of inputting a position by tracing a sensor on a flat plate with a finger, a keyboard, a mouse, and a combination thereof. Note that, a touch panel in which the input device 4 and the display device 3 are combined may be used. The input device 4 is configured to supply an input signal for causing the processor 1 to start executing the program for character recognition 21 according to Example 1 to the processor 1, in accordance with the operation of the user.

The communication device 5 is used as a wired or wireless interface for connecting to the communication network, and includes, for example, an electronic circuit for communication by using a physical layer or the like in an open systems interconnection (OSI) reference model. The communication device 5 may be a wireless communication device based on a wireless communication standard (for example, long term evolution (LTE)) defined by 3rd Generation Partnership Project (3GPP). The communication device 5 is configured to be connected to a Web server via the communication network based on an instruction from the processor 1 so as to supply an HTML document received from the Web server to the processor 1.

The various kinds of programs such as the program for character recognition 21, the browser 22, and the image processing program 23 which are stored in the storing device 2 are developed so to be executable in a memory such as RAM constituting the storing device 2, and thus are executed by the processor 1. When the processor 1 executes the program for character recognition 21, a hardware circuit for executing a first image acquiring process 210, a second image acquiring process 211, a recognition result acquiring process 212, a line image acquiring process 213, a first feature amount acquiring process 214, a second feature amount acquiring process 215, a correspondence relationship acquiring process 216, and a newline position determining process 217 is realized. In the same way, when the processor 1 executes the browser 22 and the image processing program 23, a hardware circuit for executing a drawing process 221 and a character recognition process 231 is realized. In other words, the processor 1 is appropriately converted into a hardware circuit for executing various kinds of processes by executing the various kinds of programs such as the program for character recognition 21, the browser 22, and the image processing program 23.

The program for character recognition 21 is a program that operates the processor 1 to acquire the results of character recognition from the display screen of the browser, and include a program part that causes the processor 1 to execute the first image acquiring process 210, the second image acquiring process 211, the recognition result acquiring process 212, the line image acquiring process 213, the first feature amount acquiring process 214, the second feature amount acquiring process 215, the correspondence relationship acquiring process 216, and the newline position determining process 217. When the program for character recognition 21 is executed by the processor 1, the processor 1 is operated to acquire a character recognition result from a second image drawn at a second magnification which is larger than a first magnification in the display area on the browser 22 through the character recognition process 231 of the image processing program 23, and to insert a newline code to the character recognition result of a place corresponding to a line returning position in a first image drawn at the first magnification in the display area on the browser 22.

The browser 22 is a program that causes the processor 1 to acquire an HTML file from the Web server or the like so as to create an HTML document in which characters and images are drawn in accordance with the content of the HTML file, and include a program part that causes the processor 1 to execute the drawing process 221. When the browser 22 is executed by the processor 1, the processor 1 is operated to acquire the document data such as an HTML document from the storage of the Web server or the like, and to draw the character with the font size corresponding to a certain display magnification in accordance with the content described in the acquired document data.

The image processing program 23 is a program that operates the processor 1 to output the results of the character recognition (character code or the like) by executing a character recognition process with respect to character pixels contained in an image, and include a program part that causes the processor 1 to execute the character recognition process 231 or the like. When the processor 1 is caused to execute the image processing program 23, the processor 1 is operated to execute an optical character recognition (OCR) process with respect to an image in which the characters are drawn, and to output a column of a character code corresponding to each character drawn in the image.

The first image acquiring process 210 corresponds to a program that causes the processor 1 to execute a process that acquires first image data (simply referred to as a "first image" in some cases) which is an image in which string data (simply referred to as a "string" in some cases) containing one or more characters is drawn at the first magnification through the drawing process 221 in the browser 22. The first magnification may be, for example, 100% which is the same magnification as the normal display. The drawing process 221 in the browser 22 corresponds to a program that causes the processor 1 to execute a process that outputs image data acquired by drawing the characters with the font size corresponding to the display magnification. As the drawing process 221, a hypertext markup language (HTML) rendering engine which is mounted on the Web browser may be used. Examples thereof include an HTML rendering engine "Trident" installed in the Web browser "Internet Explorer" (registered trademark) developed by Microsoft Corporation, and an HTML rendering engine "Gecko" installed in the Web browser "Firefox" (registered trademark) developed by the Mozilla project. The first image acquiring process 210 may be configured to acquire the first image data by screen-capturing a character area in an HTML page (HTML document) which is drawn at the first magnification by the HTML rendering engine. As a method of screen capture, known method may be used. For example, the process of the screen capture may be performed by using Selenium Web Driver. The Selenium Web Driver is software which provides a mechanism that operates the Web browser by using an expansion function of the Web browser and a native function of an operating system (OS) to a program (referred to as an external program), and is able to draw various types of information on the display content from the Web browser displaying the HTML document. When the Selenium Web Driver is used in the first image acquiring process 210, for example, it is possible to acquire the position of the HTML element (for example, a string element) and the attribute (for example, the attribute indicating the string element) displayed on the Web browser, and it is possible to draw an HTML page by setting the first magnification to the Web browser. Regarding the Selenium Web Driver, details are referred to http://www.seleniumhq.org/docs/03_webdriver.jsp. In addition, the function of the Web Driver is underway of the standardization work by W3C which is a standardization organization of Web technology, and details of the latest specifications are referred to https://www.w3.org/TR/webdriver/.

The second image acquiring process 211 corresponds to a program that causes the processor 1 to execute a process that acquires second image data (simply referred to as a "second image" in some cases) which is an image in which string data having the same content as the string drawn in the first image data is drawn at the second magnification which is larger than the first magnification, through the drawing process 221 in the browser 22. In a case where the first magnification is 100%, the second magnification may be, for example, 200% which is twice the first magnification. With the above-described Selenium Web Driver used, the second image acquiring process may be configured to acquire the second image data by setting the second magnification to the Web browser 22 so as to draw the HTML page.

The recognition result acquiring process 212 corresponds to a program that causes the processor 1 to execute a process that acquires the character recognition result from the second image data through the character recognition process 231 in the image processing program 23. Here, the character recognition result includes the character code of each character of the string data drawn in the second image data. In Example 1, in the recognition result acquiring process 212, character recognition result is acquired by using an image (second image data) having the character pixels drawn with the font size corresponding to the magnification (second magnification) which is larger than that at the time of the normal display, and thus it is possible to improve the accuracy of the character recognition. Here, in the first image and the second image, the newline positions may be different from each other due to various circumstances such as the occurrence of deviation in the ratio of dimension of each character to a width of an area (display area) in which strings are arranged. The character recognition process 231 in the image processing program 23 corresponds to a program that causes the processor 1 to execute a process that outputs the character code corresponding to the character drawn on the image. As the character recognition process 231 in the image processing program 23, a known OCR program may be used. Examples of the known OCR program include "tesseract-ocr" (hereinafter, referred to as Tesseract) of free software. Regarding the Tesseract, details are referred to https://github.com/tesseract-ocr.

The line image acquiring process 213 corresponds to a program that causes the processor 1 to execute a process that acquires one or more items of line image data (referred to as "line image", "line area", and "line element" in some cases) containing the area in which one or more characters are drawn along the first direction from each of the first image data acquired by the first image acquiring process 210 and the second image data acquired by the second image acquiring process 211. The line image acquiring process 213 may be configured such that a histogram indicating a cumulative density value of the character pixels which are projected in the second direction orthogonal to the first direction is created, and an area (line area) which has a length (run-length) in which a range where the cumulative density value is equal to or greater than a predetermined threshold T1 continuously appears is equal to or greater than a predetermined threshold T2 is acquired as the line image data. The threshold T1 may be set to an arbitrary value that is able to distinguish the density value of character pixels from the density value of other pixels. The threshold T2 may be set to an arbitrary value that is able to distinguish the character at the font size corresponding to the display magnification from the noise. The threshold T1 and the threshold T2 may be different values in the case of the first image data and the case of the second image data. In addition, in the above-described example, in a case where the line image is acquired from the image in which the string is drawn in the horizontal direction in a two-dimensional space in which the horizontal direction is set as an X axis, and the vertical direction is set as a Y axis, the first direction is the horizontal direction (on the X axis), and the second direction is the vertical direction (on the Y axis). In other words, the histogram indicating the cumulative density value of the character pixels which are projected in the second direction is, for example, a cumulative density value of character pixels which are projected on the Y axis. That is, in the description of Example 1, projecting the character pixels in the second direction means that the character pixels are projected on the axis (for example, on the Y axis) which defines the second direction (for example, in the vertical direction). Similarly, projecting the character pixels in the first direction means that the character pixels are projected on the axis (for example, on the X axis) which defines the first direction (for example, the horizontal direction). Note that, the first direction is the horizontal direction in a case where the writing is performed in the lateral direction, and is the vertical direction in a case where the writing is performed in the vertical direction. In addition, the "line" indicates that the characters are arranged in the horizontal direction in the case where the writing is performed in the horizontal direction, and indicates that the characters are arranged in the vertical direction in the case where the writing is performed in the vertical direction. Note that, the "characters" include numbers and symbols.

The first feature amount acquiring process 214 corresponds to a program that causes the processor 1 to execute a process that acquires the first feature amount which is the feature amount of the character pixels along the first direction from each of the one or more items of line image data acquired from the first image data through the line image acquiring process 213. The first feature amount acquiring process 214 may be configured such that the cumulative density value, which is acquired by projecting the density value of each pixel contained in each line image data acquired from the first image data in the first direction, is the first feature amount. For example, in the case where the first direction is the horizontal direction, a value (cumulative density value) acquired by accumulating the density value of each pixel contained in the line image data in a column may be the first feature amount. In this example, in a case of the line image in which N pixels are arranged in the first direction (for example, the horizontal direction), and M pixels are arranged in the second direction (for example, the vertical direction), the first feature amount may be N cumulative density values acquired by accumulating the density values of the M pixels in a column. In a case where a binary image in which the density value of the character pixels is 1, and the density value of other pixels is 0 is used as the line image data, the cumulative density value of the first feature amount is equivalent to the number of the cumulated character pixels.

Figure 2A:
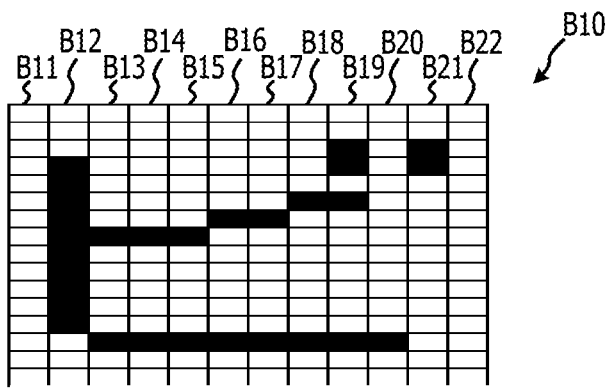
FIGS. 2A to 2C are diagrams (Part 1) illustrating an example of a step of acquiring a first feature amount in a case where a first direction is a horizontal direction (X axis)
Figure 2B:
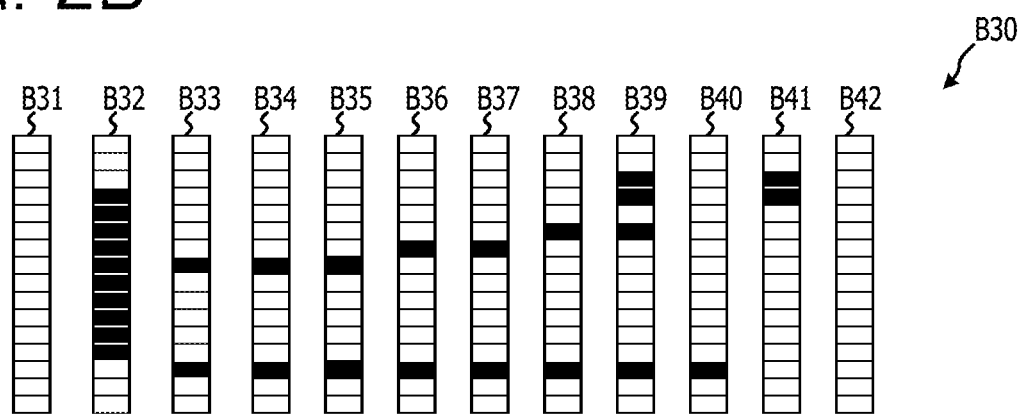
Figure 2C:
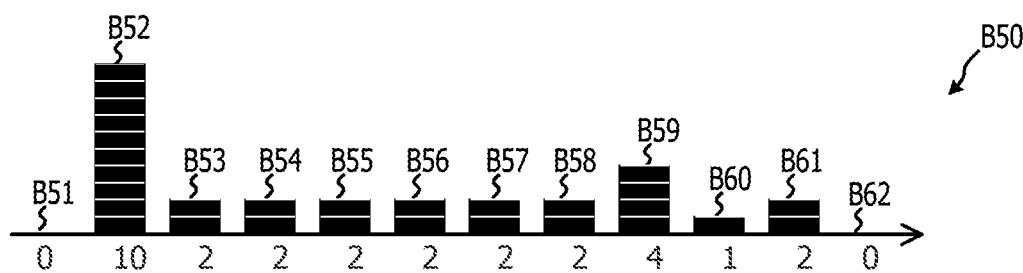

With reference to FIGS. 2A to 2C, an example of a step of acquiring the first feature amount in the case where the first direction is the horizontal direction (X axis) will be described. FIG. 2A is a diagram illustrating an example of the line image in which character pixels corresponding to one character of a Japanese katakana are drawn in an area B10 in which 16 vertical pixels×12 horizontal pixels are arranged. In the examples of FIG. 2A, the character pixels are indicated by black (density value is 1), and other pixels are indicated by white (density value is 0). FIG. 2A illustrates pixel array B11 to pixel array B22 which are projected in the first direction, and each pixel array is composed of a set of pixels having the same coordinate values on the X axis.

FIG. 2B illustrates an area B30, having the same character pixels as those in the area B10 illustrated in FIG. 2A, exploded for each pixel array for convenience of explanation. Each of pixel array B31 to pixel array B42 as illustrated in FIG. 2B corresponds to each of the pixel array B11 to B22 as illustrated in FIG. 2A. FIG. 2C is a diagram illustrating a histogram B50 of the cumulative density value of each of the pixel arrays as illustrated in FIG. 2B. In FIG. 2C, an arrow of the horizontal direction indicates the X axis of the first direction. FIG. 2C illustrates first feature amounts B51 to B62 which are the feature amount of the character pixels along the first direction, and each of the first feature amounts B51 to B62 corresponds to the cumulative density value of the pixel arrays B31 to B42 projected on the X axis. In the example of FIG. 2C, the feature amount B51 is a cumulative density value acquired by accumulating the density value of each pixel of the pixel array 31, and the value thereof is 0. Similarly, the feature amount B52 of the pixel array 32 is a cumulative density value "10", the feature amount B53 of the pixel array 33 is a cumulative density value "2". Each of the feature amount B54 of the pixel array 34, the feature amount B55 of the pixel array 35, the feature amount B56 of the pixel array 36, the feature amount B57 of the pixel array 37, the feature amount B58 of the pixel array 38, and the feature amount B61 of the pixel array 41 is a cumulative density value "2". The feature amount B59 of the pixel array B39 is a cumulative density value "4". The feature amount B60 of the pixel array B40 is a cumulative density value "1". In addition, the feature amount B62 of the pixel array B42 is a cumulative density value "0". That is, the first feature amount acquired from the example of FIG. 2C includes {0, 10, 2, 2, 2, 2, 2, 2, 4, 1, 2, 0} which are the feature amount B51 to B62 in 12 pixel arrays.

In addition, in the first feature amount acquiring process 214, a section for accumulating the density value of each pixel may be divided into a plurality of sections at the time of acquiring the first feature amount. In the case where the first direction is the horizontal direction, for example, a column of the pixels contained in the line data is divided into four sections, and the cumulative density value of one column in each section may be calculated. In this example, in a case of an line image in which N pixels are arranged in the first direction (for example, the horizontal direction), and M pixels are arranged in the second direction (for example, the vertical direction), the first feature amount may be 4×N cumulative density values in total by acquiring four sections of N cumulative density values acquired by accumulating the density values of M/4 pixels in the column. In Example 1, the number of divisions is not limited to 4, and other number of divisions may be used.

Figure 3:
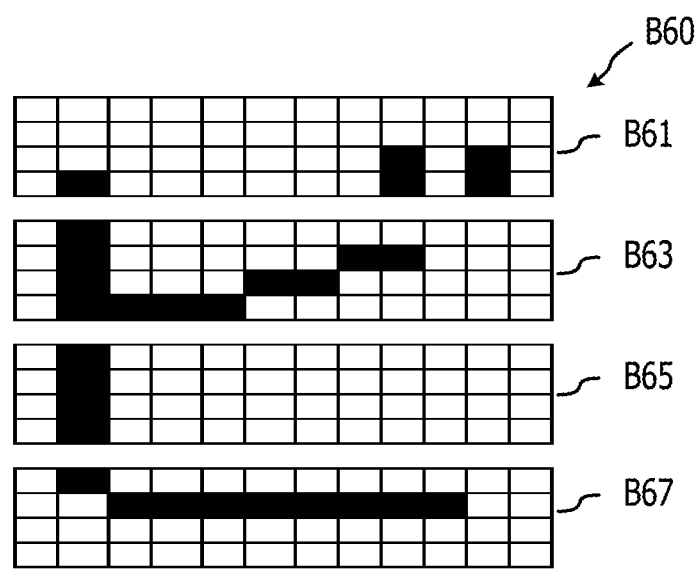
FIG. 3 is a diagram (Part 2) illustrating an example of a step of acquiring the first feature amount in a case where the first direction is the horizontal direction (X axis)

Another example of a step of acquiring the first feature amount in the case where the first direction is the horizontal direction (X axis) will be described with reference to FIG. 3 and FIGS. 4A to 4D. Similar to FIG. 2A, FIG. 3 is a diagram illustrating an example of the line image in which character pixels corresponding to one character of a Japanese katakana are drawn in an area B60 in which 16 vertical pixels×12 horizontal pixels are arranged. The area B60 in FIG. 3 has four divided areas of a partial area B61, a partial area B63, a partial area B65, and a partial area B67 which are along the second direction (Y axis) orthogonal to the first direction.

Figure 4C:
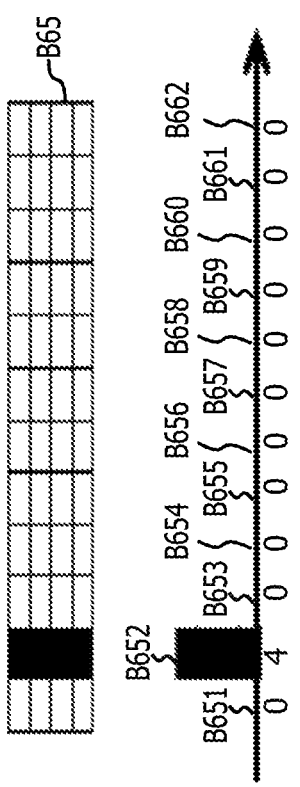
FIGS. 4A to 4D are diagrams (Part 3) illustrating an example of a step of acquiring the first feature amount in a case where the first direction is the horizontal direction (X axis)
Figure 4D:
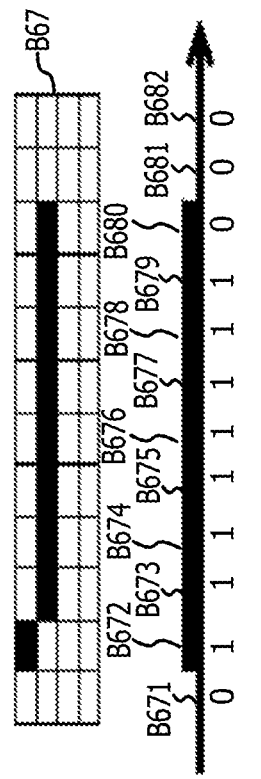
Figure 4A:
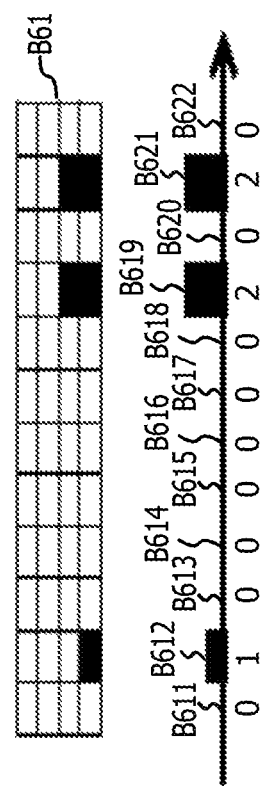
Figure 4B:
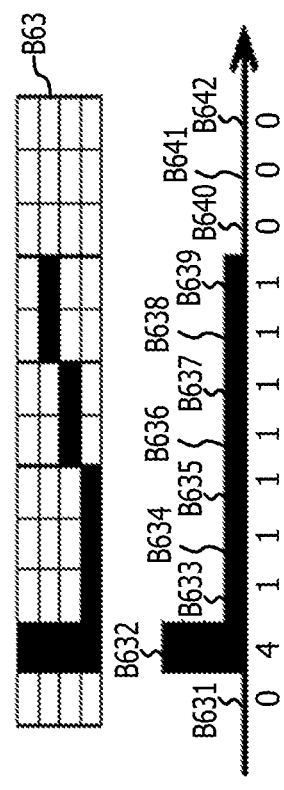

FIG. 4A illustrates the first feature amounts B611 to B622 indicated by the cumulative density values acquired by projecting the pixels of the partial area B61 in the first direction (X axis), and when the values of the first feature amounts B611 to B622 are arranged on the X axis, the coordinate values of {0, 1, 0, 0, 0, 0, 0, 0, 2, 0, 2, 0} are acquired. FIG. 4B illustrates the first feature amounts B631 to B642 illustrated by the cumulative density values acquired by projecting each pixel of the partial area B63 in the first direction (X axis), and when the values of the first feature amounts B631 to B642 are arranged on the X axis, the coordinate values of {0, 4, 1, 1, 1, 1, 1, 1, 1, 0, 0, 0}. FIG. 4C illustrates the first feature amounts B651 to B662 illustrated by the cumulative density values acquired by projecting each pixel of the partial area B65 in the first direction (X axis), and when the values of the first feature amounts B651 to B662 are arranged on the X axis, the coordinate values of {0, 4, 0, 0, 0, 0, 0, 0, 0, 0, 0, 0}. FIG. 4D illustrates the first feature amounts B671 to B682 illustrated by the cumulative density values acquired by projecting each pixel of the partial area B67 in the first direction (X axis), and when the values of the first feature amounts B671 to B682 are arranged on the X axis, the coordinate values of {0, 1, 1, 1, 1, 1, 1, 1, 1, 1, 0, 0}. As such, the first feature amount having 4×12 cumulative density values may be acquired from the area B60 in which 16 vertical pixels×12 horizontal pixels are arranged.

The process returns to the description of FIG. 1. The second feature amount acquiring process 215 corresponds to a program that causes the processor 1 to execute a process that acquires the second feature amount which is the feature amount of the character pixels along the first direction from each of the one or more items of the line image data acquired from the second image data through the line image acquiring process 213. The second feature amount acquiring process 215 may be configured such that the cumulative density value, which is acquired by projecting the density value of each pixel contained in each line image data acquired from the second image data in the first direction, is the second feature amount. For example, in the case where the first direction is the horizontal direction, a value (cumulative density value) acquired by accumulating the density value of each pixel contained in the line image data in a column may be the second feature amount. In this example, in a case of the line image in which N pixels are arranged in the first direction (for example, the horizontal direction), and M pixels are arranged in the second direction (for example, the vertical direction), the second feature amount may be N cumulative density values acquired by accumulating the density values of the M pixels in a column. In addition, the section to be accumulated may be divided into a plurality of sections. In the case where the first direction is the horizontal direction, for example, a column of the pixels contained in the line data is divided into four sections, and the cumulative density value of one column in each section may be calculated. In this example, in a case of an line image in which N pixels are arranged in the first direction (for example, the horizontal direction), and M pixels are arranged in the second direction (for example, the vertical direction), the second feature amount may be 4×N cumulative density values in total by acquiring four sections of N cumulative density values acquired by accumulating the density values of M/4 pixels in the column. In Example 1, the number of divisions is not limited to 4, and other number of divisions may be used.

The correspondence relationship acquiring process 216 corresponds to a program that causes the processor 1 to execute a process that acquires a correspondence relationship of the character pixels of the first image data and the second image data in the first direction by comparing the first feature amount relating to the first image data with the second feature amount relating to the second image data. The correspondence relationship acquiring process 216 may be configured such that the first feature amount acquired from each line image data of the first image data is used as the first feature amount relating to the first image data in the first feature amount acquiring process 214. Further, the correspondence relationship acquiring process 216 may be configured such that the second feature amount acquired from each line image data of the second image data is used as the second feature amount relating to the second image data in the second feature amount acquiring process 215. In addition, the correspondence relationship acquiring process 216 may be configured to acquire the correspondence relationship of the character pixel in the first image data and the second image data in the first direction by matching (hereinafter, referred to as DP matching) using a dynamic programming (DP) method. For example, corresponding arrangement of pixels having a similar pattern of the feature amount (for example, the cumulative density value) of the character pixels projected in the first direction is performed between the line image data of the first image data and the line image data of the second image data. As a result of the matching process, as information on the correspondence relationship of pixel arrays between the first image data and the second image data, for example, a correspondence relationship table having lattice points (conversion pairs) indicating the correspondence relationship of the coordinate values in the first direction of the line image data of the first image data and the line image data of the second image data is created.

The newline position determining process 217 corresponds to a program that causes the processor 1 to execute a process that adjusts newline positions of the character recognition results acquired from the second image data by using the newline position of string data drawn in the first image data. In other words, the newline position determining process 217 corresponds to a program that causes the processor 1 to execute a process that makes a newline position in the character recognition result by specifying the position in the second image data in the first direction which corresponds to an end position in the first direction of each of the items of line image data acquired from the first image data based on the correspondence relationship acquired through the correspondence relationship acquiring process 216. For example, the newline position determining process 217 may be configured to specify the correspondence relationship having the coordinate value (first coordinate value) corresponding to the end position in the first direction of the line image data by referring to the correspondence relationship table created in the correspondence relationship acquiring process 216 in order of the coordinate value in the first direction of each line image data in the first image data. In a case where the line image data of the first image is composed of N pixel arrays in a range of the coordinate values $\{1, \ldots, N\}$ in the first direction, the first coordinate value is, for example, N. Further, the newline position determining process 217 may be configured to specify the coordinate value (second coordinate value) in the first direction of the line image data in the second image data by referring to the correspondence relationship having the first coordinate value. The pixels in the first coordinate value are at the end position in the first direction, and thus are assumed to be pixels corresponding to pixels which are at the newline position, and does not contain the character pixels, or pixels positioned at the end of the character. There is a possibility that the pixels of the line image data in the second image data which have a pattern of the feature amount similar to the pixel in the first coordinate value correspond to the pixels at the newline position of the first image data. Here, the newline position determining process 217 may be configured to insert a newline code immediately after a character code string corresponding to the recognition result, which is acquired from the partial image from the starting end of the line image to the second coordinate value of the second image data, among the character recognition results acquired from the second image data in the recognition result acquiring process 212. With this, in the character recognition result acquired using the second image data which enables character recognition with higher accuracy than the first image data, it is possible to insert the newline code in the place corresponding to the newline position in the first image data, and it is possible to further improve the accuracy of character recognition.

Next, an example of the flow of the character recognition process according to Example 1 will be described with reference to FIG. 5. FIG. 5 is a diagram illustrating an example of the flow of the character recognition process according to Example 1. The processor 1 of the apparatus for character recognition 100 according to Example 1 may start the execution of the character recognition process illustrated in FIG. 5, for example, when an input signal for causing the processor 1 to start the execution of the program for character recognition 21 is supplied from the input device 4 to the processor 1 in response to a user operation.

The processor 1 sets the display magnification of the browser 22 as the first magnification, and displays the input HTML document on the browser 22 (S101). This process S101 is an example of a process realized when the processor 1 executes the first image acquiring process 210 of the program for character recognition 21. Here, the input HTML document is an HTML document acquired from a Web server via the communication device 5 based on a uniform resource locator (URL) indicating a storage place of the HTML document displayed on the browser 22 at the time of starting the executing the character recognition process as illustrated in FIG. 5, or in the step of executing the character recognition process. For example, the processor 1 may download the HTML document from the storage place specified by URL by executing the browser 22 by designating a predetermined URL using the Web Driver's API. In the process S101, the HTML document acquired by the processing of the browser 22 is analyzed by the processor 1 operating as an HTML analysis engine in the browser 22, and is stored in the storing device 2 as a document object model (DOM) structure containing an HTML element such as a string element. The processor 1 which operates as a rendering engine in the browser 22 draws each HTML element contained in the DOM structure in the display area of the browser 22 using the font size corresponding to the first magnification. Note that, in a case where the display magnification of the browser 22 is set as the first magnification before the process S101, the processor 1 may not set the display magnification as the first magnification anew in the process S101.

Figure 6:
FIG. 6 is a diagram illustrating an example of a first image.

The processor 1 acquires the first image data by screen-capturing an area (string display area) in which the string elements of the HTML document drawn at the first magnification are displayed (S102). The process S102 is an example of the process realized by causing the processor 1 to execute the first image acquiring process 210 of the program for character recognition 21. FIG. 6 is a diagram illustrating an example of the first image. A first image C10 in FIG. 6 has a line in which a string of "ABC" is drawn and a line in which a string of "DEF" is drawn in an area where the aspect ratio is 10:3. In other words, in the first image C10 in FIG. 6, a newline is present between the string "ABC" and the string "DEF". Note that, the processor 1 may store the first image data acquired in the process S102 in the storing device 2. In the process S102, the processor 1 may specify the range of the character area to be screen-captured by acquiring information (for example, a position (coordinate value), width, and height of the string display area) on the display area (string display area) of the string elements among the HTML elements contained in the DOM structure from the browser 22 using an API of the Web Driver. Alternatively, the range of the character area may be specified by a known method using a histogram of the cumulative density value of the character pixels.

The processor 1 sets the display magnification as the second magnification of the browser 22, and displays the HTML document same as that in the process S101 on the browser (S103). The process S103 is an example of the process realized by causing the processor 1 to execute the second image acquiring process 211 of the program for character recognition 21. Here, since the second magnification improves the accuracy of the character recognition, the magnification larger than the first magnification used in the process S101 is used. For example, in a case where the first magnification is 100%, the second magnification may be 200% which is twice the first magnification. In the process S103, the processor 1 operating as the rendering engine in the browser 22 draws each HTML element included in the DOM structure in the display area of the browser 22 using the font size corresponding to the second magnification. Note that, in the process S103, the display area of the browser 22 may not be displayed on the display device 3. For example, the display area of the browser 22 drawn using the second magnification may not be displayed on the display device 3 but may be processed as internal data.

Figure 7:
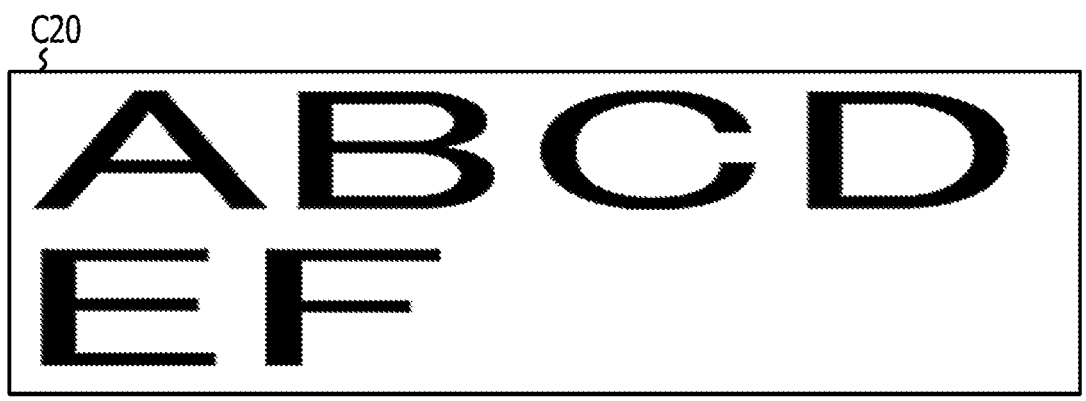
FIG. 7 is a diagram illustrating an example of a second image.

The processor 1 acquires the second image data by screen-capturing the string display area of the HTML document displayed at the second magnification (S104). The process S104 is an example of the process realized by causing the processor 1 to execute the second image acquiring process 211 of the program for character recognition 21. Note that, the processor 1 may store the second image data acquired in the process S104 to the storing device 2. In the process S104, the processor 1, the processor 1 may specify the range of the string display area to be screen-captured by acquiring information (for example, a position (coordinate value), width, and height of the string display area) on the display area (string display area) of the string elements among the HTML elements contained in the DOM structure from the browser 22 using an API of the Web Driver. Alternatively, the range of the string display area may be specified by a known method using a histogram of the cumulative density value of the character pixels. FIG. 7 is a diagram illustrating an example of the second image. A second image C20 in FIG. 7 has a line in which a string "ABCD" is drawn, and a line in which a string "EF" is drawn in an area where the aspect ratio is 10:3 similar to FIG. 6. Here, the size of the second image C20 is twice the first image C10 in each of the vertical and horizontal directions. In the second image C20 in FIG. 7, a newline is present between the string "ABCD" and the string "EF". That is, the newline position between the first image C10 and the second image C20 is shifted by one character. The reason for this is that even if the second magnification is R times the first magnification, values such as character width and character interval of the font size in accordance with the second magnification may be different from a value acquired by simply multiplying the values such as character width and character interval of the font size in accordance with the first magnification by R times. In other words, even though the string display area of the HTML document displayed at the second magnification is enlarged and drawn while maintaining the aspect ratio to be the same as that of the string display area displayed at the first magnification, the layout of the characters between the first image and the second image may be different from each other.

Figure 8:
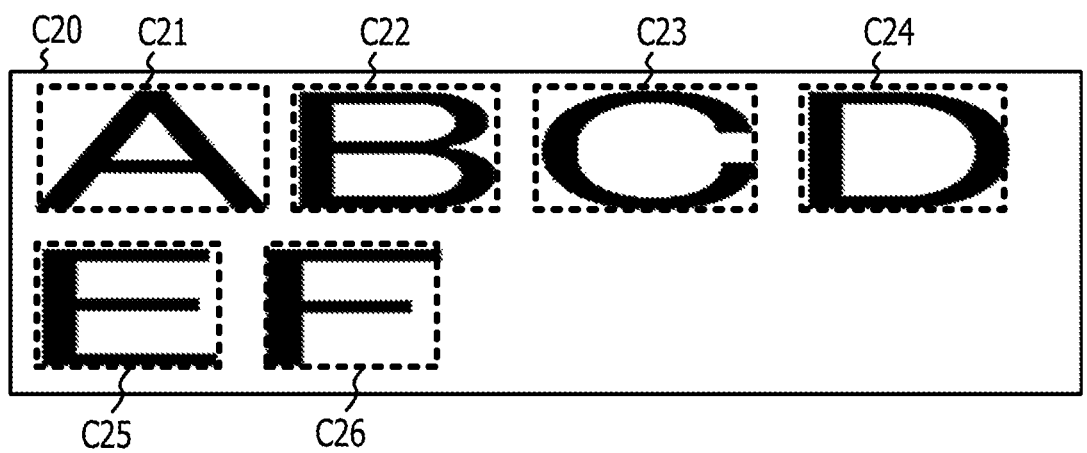
FIG. 8 is a diagram illustrating an example of a character frame acquired from second image data.

The processor 1 acquires the character recognition result from the second image data acquired in the process S104 through the process as the character recognition process included in the image processing program 23 (S105). The process S105 is an example of the process realized by causing the processor 1 to execute the recognition result acquiring process 212 of the program for character recognition 21. Here, the character recognition result includes a character code of each of the characters drawn in the second image data. As the character recognition result, information on a character frame indicating the area where the character pixels of each character are arranged may be further included. Examples of the information on the character frame include a coordinate value of an upper left corner of the character frame and a height and width indicating the size of the character frame. FIG. 8 is a diagram illustrating an example of a character frame acquired from second image data. In FIG. 8, the character frames C21 to C26 are arranged corresponding to the area where character pixels in each character of the string of "ABCDEF" are arranged.

Next, an example of a data structure of recognition result information T10 illustrating the character recognition result acquired from the second image data as illustrated in FIG. 8 will be described with reference to FIG. 9. FIG. 9 is a diagram illustrating an example of the data structure of the recognition result information T10 indicating the character recognition result acquired from the second image data as illustrated in FIG. 8. The recognition result information T10 in FIG. 9 includes an information structure in which the character elements indicating the recognition result of each character contained in the string "ABCDEF" as drawn in FIG. 8 are stored. That is, the recognition result information T10 in FIG. 9 include seven character elements in total of the character element corresponding to each character contained in the string "ABCDEF" and the character elements corresponding the newline position in the string. Accordingly, a value "7" is set for an item of element number T11 of the recognition result information T10 as illustrated in FIG. 9. Each character element has a character code and character frame information corresponding to a character recognized from character pixels in the character frame, and the character frame information includes a character frame position indicating the position of the left corner of the character frame, and the information on the width and height of the character frame. The seven character elements of a character element [1] T12 to a character element [7] T18 are arranged corresponding to the arrangement of the string, and for example, the first character element [1] T12 corresponds to a character "A" position at the beginning of the string, and in the column of the character code, an American standard code for information interchange (ASCII) code of "0×41" is set as a character code corresponding to the character "A". Note that, as the values set in the column of the character code, values of other character code schemes such as Unicode transformation format-8 (UTF-8) may be used.

In FIG. 9, a character element [5] T16 corresponding to a newline code "0×0A" (LF) is stored between a character element [4] T15 corresponding to a character "D" (0×44) positioned fourth from the beginning of the string and a character element [6] T17 corresponding to a character "E" (0×45) positioned fifth from the beginning of the string. The reason for this is that a newline is made between "D" and "E" of the string drawn in FIG. 8. Note that, the value of the newline code is an example, and may be, for example, "0×0D" (CR), or may be in combination "0×0D" (CR) and "0×0A" (LF). In this way, the newline position of the recognition result information as illustrated in FIG. 9 is the recognition result acquired from the string layout in the second image data drawn at the second magnification, and thus it is possible to insert the newline code in a position which is different from the string layout of the first image data drawn at the first magnification as illustrated in FIG. 6.

The process returns to the description of FIG. 5. The processor 1 acquires one or more items of the line image data relating to the second image data from the second image data acquired in the process S104 by acquiring one or more items of the line image data relating to the first image data from the first image data acquired in the process S102 (S106). The process S106 is an example of the process realized by causing the processor 1 to execute the line image acquiring process 213 of the program for character recognition 21. In the process S106, the processor 1 may specify, for example, an area (line area) in which one or more characters are drawn along the first direction, generate the line area information indicating the information relating to the line area, and refer to a set of pixels in the area indicated by the line area information as the line image data. The processor 1 may specify the line area by using a histogram of the cumulative density value acquired by projecting the character pixels along the second direction orthogonal to the first direction, for example. That is, the processor 1 generates the histogram of the character pixels projected in the second direction by arranging the cumulative density values acquired by accumulating the density values of pixels arranged consecutively in the first direction along the second direction, and the line area may be specified by calculating the range where the cumulative density value is consecutively equal to or greater than the threshold on the histogram.

Figure 10:
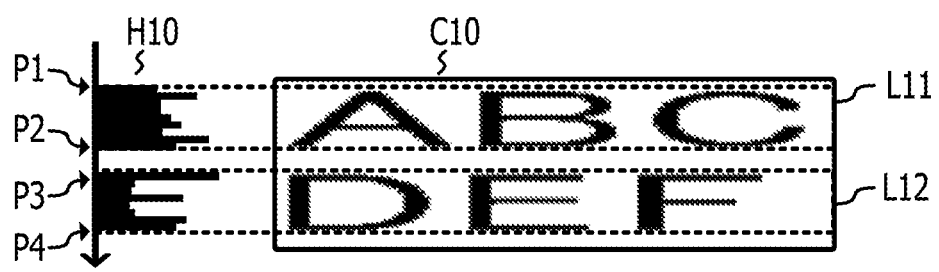
FIG. 10 is a diagram illustrating an example of a step of acquiring line image data from first image data.

FIG. 10 is a diagram illustrating an example of a step of acquiring line image data from first image data. In the example of FIG. 10, a histogram H10 of the cumulative density value acquired by projecting the character pixels drawn on the first image data C10 along the Y axis is illustrated. Note that, the Y axis in the example of FIG. 10 is an example of the second direction orthogonal to the first direction. The processor 1 may specify an area which is divided into ranges P1 to P2 and ranges P3 to P4 where the values on the histogram H10 in FIG. 10 are consecutively indicating a predetermined threshold as a line area L11 and a line area L12. Note that, in a case where the range acquired from the histogram H10 does not have the size corresponding to the height of one character in response to the font size, the processor 1 may be excluded from the line area as noise. The procedure for acquiring one or more line image data from the second image data is the same.

FIG. 11 is a diagram illustrating an example of a data structure of line area information which is the information relating to the line area specified in the example of the first image data as illustrated in FIG. 10. The line area information T40 as illustrated in FIG. 11 includes the information relating to the line area L11 and the line area L12 as illustrated in FIG. 10 as line elements, and thus, a value of 2 indicating the number of the line elements is set for an item of element number T41. In each of the line elements, "upper end Y coordinate value" indicating the Y coordinate value at upper end of the line area, and "height" indicating the height of the line area (length in the vertical direction) are set. For example, in the upper end Y coordinate value T421 of the first line element T42, the Y coordinate value on the first image corresponding to the position of P1 as illustrated in FIG. 10 is set as the Y coordinate value of the upper end of the line area L11. Further, in the height T422 of the first line element T42, as the height of the line area L11, a value may be set based on the difference value between the Y coordinate value on the first image corresponding to the position of P1 as illustrated in FIG. 10 and the Y coordinate value on the first image corresponding to the position of P2 as illustrated in FIG. 10 may be set. In the same way, in the second line element T43, the Y coordinate value on the first image corresponding to the position of P3 as illustrated in FIG. 10 may be set as the upper end Y coordinate value, and a value based on the difference value between the Y coordinate value on the first image corresponding to the position of P3 as illustrated in FIG. 10 and the Y coordinate value on the first image corresponding to the position of P4 as illustrated in FIG. 10 may be set as the height. By referring to the line area information exemplified in FIG. 11, the processor 1 may acquire line image data including pixels belonging to the line area among the pixels included in the first image data. Similarly, regarding the line area acquired from the second image data, the line area information having the same data structure as the example in FIG. 11 is generated, and the processor 1 refers to the line area information on the second image data, and thereby it is possible to acquire line image data including the pixels belonging to the line area among the pixels included in the second image data.

The process returns to the description of FIG. 5. The processor 1 acquires the first feature amount which is the feature amount of the character pixels along the first direction from each of one or more line images acquired from the first image data (S107). The process S107 is an example of the process realized by causing the processor 1 to execute the first feature amount acquiring process 214 of the program for character recognition 21. The first feature amount is a histogram of the cumulative density value acquired by projecting the density value of each pixel contained in each line image data acquired from the first image data in the first direction. For example, in a case of the line image in which N pixels are arranged in the first direction (for example, the horizontal direction), and M pixels are arranged in the second direction (for example, the vertical direction), the first feature amount may be N cumulative density values acquired by accumulating the density values of the M pixels in column. In a case where a binary image in which the density value of the character pixels is 1, and the density value of other pixels is 0 is used as the line image data, the cumulative density value of the first feature amount is equivalent to the number of the cumulated character pixels.

In the process S107, before acquiring the first feature amount, the process of enlarging each line image data of the first image data to the second direction may be performed such that the processor 1 sets the number of the pixels in the second direction of each line image data acquired from the first image data to be approximately the same as the number of the pixels of the line image data of the second image data. For example, in a case where the second direction is the Y axis (vertical direction), the processor 1 may perform an imaging process that enlarges each line image data acquired from the first image data in the Y axis direction based on the ratio (conversion rate) of the sum of the height of each line image (length of Y axis direction) acquired from the first image data and the sum of the height of each line image acquired from the second image data. Alternatively, the processor 1 may perform an imaging process that enlarges each line image data acquired from the first image data in the Y axis direction based on the ratio (conversion rate) between the first magnification and the second magnification, which is the display magnification set in the browser 22 in the process S101 and the process S103. When the number of the pixels of each line image data of the first image data are substantially the same as those of the second image data in the second direction, the ranges of acquirable values of the first feature amount in the first image data acquired in the process S107 and the second feature amount in the second image data acquire in the process S108 (described later) may be approximately the same as each other, and thus the search process of the correspondence relationship may be efficiently performed in the comparison between the first feature amount and the second feature amount. For example, in a case of using a value based on the difference between the first feature amount and the second feature amount as an index indicating the similarity of the pixels of the first image and the pixels of the second image, the higher the degree of similarity, the closer the difference between the first feature amount and the second feature amount approaches the value perform 0, and thus it is possible to save the storage capacity of the index indicating the similarity for each pixel. Note that, the enlarging process may be performed by using the conversion rate in the first direction. Hereinafter, the operation in the case where the enlarging process is performed only in the second direction will be described. Regarding the operation in the case where the enlarging process is performed in the first direction, the number N1 of pixel arrays included in each line image of the first image in process S109 and process S110 which will be described later may be appropriately replaced with a value obtained by being enlarge with the conversion rate.

The above enlarging process may be performed for each value of the first feature amount after acquiring the first feature amount from each line image data of the first image data. Also in this case, the ranges of acquirable values between the first feature amount in the first image data acquired in the process S107 and the second feature amount in the second image data acquire in the process S108 may be approximately the same as each other, and thus the search process of the correspondence relationship may be efficiently performed in the comparison between the first feature amount and the second feature amount. Note that, Example 1 is not limited to the above examples, and for example, at the time of comparing with process S109 described later, the first feature amount and the second feature amount may be set so that the maximum value and the minimum value of each feature amount are substantially the same as each other.

Figure 12A:
FIGS. 12A and 12B are diagrams (Part 1) illustrating an example of the first feature amount acquired from the first image data.
Figure 12B:
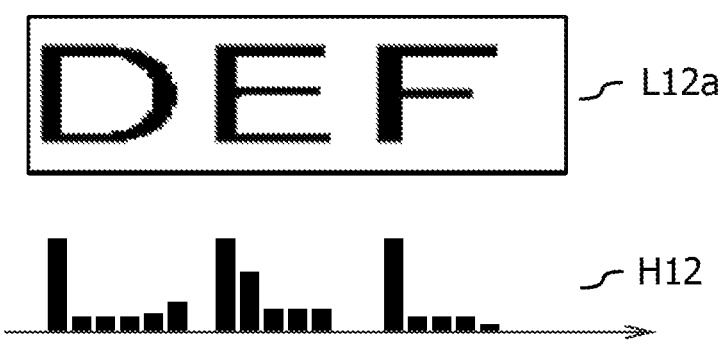

FIGS. 12A and 12B are diagrams illustrating an example of the first feature amount for the line image data acquired from the first image data C10 as illustrated in FIG. 10. Here, in the line image data L11a and line image data L12a as illustrated in FIGS. 12A and 12B, the enlarging process is performed so that the pixels of the line areas L11 and L12 on the first image data C10 as illustrated in FIG. 10 are substantially the same as the line area of the second image data C20 in the Y axis direction. The line image data L11a as illustrated in FIG. 12A has the character pixels in which the string of "ABC" is drawn, and the processor 1 acquires a histogram H11 which is the first feature amount of line image data L11a by projecting the character pixels of line image data L11a along the X axis direction (horizontal direction) which is the first axis direction. In the same way, the line image data L12a as illustrated in FIG. 12B has the character pixels in which the string "DEF" is drawn, and the processor 1 acquires a histogram H12 which is the first feature amount of line image data L12a by projecting character pixels of line image data L12a along the X axis direction which is the first axis direction. Note that, the line image data and the histogram illustrated in FIGS. 12A and 12B are merely for the sake of convenience in describing Example 1, the correspondence relationship between each pixel array and the histogram of the line image data illustrated in FIGS. 12A and 12B may not be drawn in a strict correspondence.

The histogram H11 and the histogram H12 in the examples of FIGS. 12A and 12B may have, for example, a data structure in which the information of the cumulative density value is stored corresponding to the coordinate value on the X axis where each accumulated pixel array is positioned. FIG. 13 is an example of the data structure of the first feature amount information T20 in which the first feature amount relating to the first image data C10 illustrated in FIG. 10 is stored. In the first feature amount information T20 as illustrated in FIG. 13, a value "2" which is the number of the line image data acquired from the first image data C10 is set for an item of the element number T21, and the first feature amount acquired from each line image data is stored in the line element T22 and line element T23. In addition, in each of the line elements T22 and T23, the feature amount (for example, the cumulative density value) of each pixel array is stored corresponding to the coordinate value on the X axis on which each pixel array is positioned. For the second feature amount, the same data structure as in FIG. 13 may be used.

In addition, the cumulative density value as the first feature amount may include two or more cumulative values in which a section (cumulative interval) for accumulating the density value of character pixels is divided into plural. For example, in the line image in which N pixels are arranged in the first direction (for example, the horizontal direction) and M pixels are arranged in the second direction (for example, the vertical direction), in a case where the cumulative section is divided into four sections, the first feature amount acquired from one of the items of line image data may be 4×N cumulative density values in total by acquiring four sections of N cumulative density values acquired by accumulating the density values of M/4 pixels in the column.

Figure 14C:
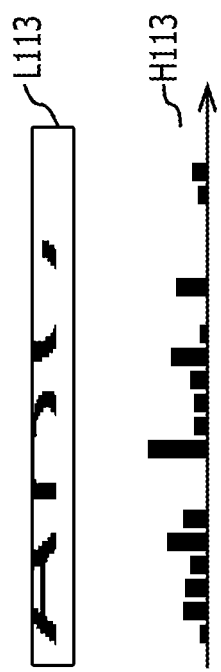
FIGS. 14A to 14D are diagrams (Part 2) illustrating an example of the first feature amount acquired from the first image data.
Figure 14D:
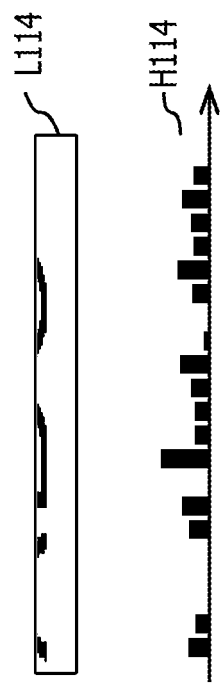
Figure 14A:
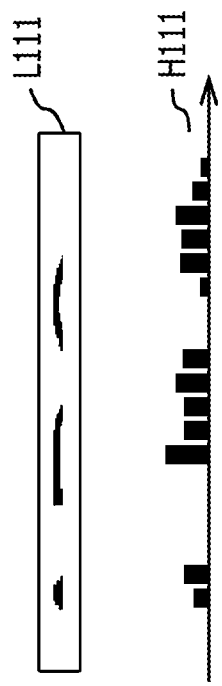
Figure 14B:

FIGS. 14A to 14D are diagrams illustrating an example of partial areas L111 to L114 obtained by equally dividing the line image data L11a illustrated in FIG. 12A into four areas in the Y axis direction (vertical direction), and the first feature amounts H111 to H114 for the partial areas. The partial area L111 illustrated in FIG. 14A is an area located at the top of the partial areas obtained by equally dividing the line image data Lila illustrated in FIG. 12A into four areas, and the processor 1 acquires a histogram H111 which is the first feature amount for the partial area L111 of the line image data Lila by projecting character pixels of the partial area L111 along the X axis direction (horizontal direction) which is the first direction. The partial area L112 illustrated in FIG. 14B is an area located second from the top of the partial areas obtained by equally dividing the line image data Lila illustrated in FIG. 12A into four areas, and the processor 1 acquires a histogram H112 which is the first feature amount for the partial area L112 of the line image data Lila by projecting character pixels of the partial area L112 along the X axis direction (horizontal direction) which is the first direction. The partial area L113 illustrated in FIG. 14C is an area located third from the top of the partial areas obtained by equally dividing the line image data Lila illustrated in FIG. 12A into four areas, and the processor 1 acquires a histogram H113 which is the first feature amount for the partial area L113 of the line image data Lila by projecting character pixels of the partial area L113 along the X axis direction (horizontal direction) which is the first direction. The partial area L114 illustrated in FIG. 14D is an area located fourth from the top of the partial areas obtained by equally dividing the line image data Lila illustrated in FIG. 12A into four areas, and the processor 1 acquires a histogram H114 which is the first feature amount for the partial area L114 of the line image data Lila by projecting character pixels of the partial area L114 along the X axis direction (horizontal direction) which is the first direction. Note that, the line image data and the histogram illustrated in FIGS. 14A to 14D are merely for convenience in describing Example 1, and correspondence relationship between each pixel array and the histogram of the line image data illustrated in FIGS. 14A to 14D may not be drawn in a strict correspondence.

The histogram H111 to histogram H114 in the examples of FIGS. 14A to 14D may have, for example, a data structure in which the information of the cumulative density value is stored corresponding to the coordinate value on the X axis where each accumulated pixel array is positioned. FIG. 15 illustrates an example of the data structure of the first feature amount information T30 in a case where the first feature amount is acquired for each partial area obtained by dividing the line image data from the first image data C10 as illustrated in FIG. 10 into four areas as illustrated in FIGS. 14A to 14D. In the first feature amount information T30 illustrated in FIG. 15, the value "2" which is the number of the line image data acquired from the first image data C 10 is set in the column of element number T31, and the first feature amount acquired from the partial area of each line image data is stored in the line element T32 and the line element T33. In each of the line elements T32 and T33, the feature amount (for example, cumulative density value) of the pixel array in each partial area is stored corresponding to the coordinate value on the X axis where each pixel array in each partial area is positioned. For example, the feature amount of each pixel array in the partial area L111 illustrated in FIG. 14A is stored in a feature amount A [1] to a feature amount A [N] of a line element [1] T32, the feature amount of each pixel array in the partial area L112 illustrated in FIG. 14B is stored in a feature amount B [1] to a feature amount B [N] of the line element [1] T32, the feature amount of each pixel array in the partial area L113 as illustrated in FIG. 14C is stored in a feature amount C [1] to a feature amount C [N] of the line element [1] T32, and the feature amount of each pixel array in the partial area L114 as illustrated in FIG. 14D is stored in a feature amount D [1] to a feature amount D [N] of the line element [1] T32. The same data structure as that in FIG. 15 may be used for the second feature amount.

The process returns to the description of FIG. 5. The processor 1 acquires the second feature amount which is the feature amount of the character pixels along the first direction from each of one or more line images acquired from the second image data (S108). The process S108 is an example of the process realized by causing the processor 1 to execute the second feature amount acquiring process 215 of the program for character recognition 21. The second feature amount is a histogram of the cumulative density value acquired by projecting the density value of each pixel contained in each line image data of the second image data in the first direction. For example, in a case of the line image in which N pixels are arranged in the first direction (for example, the horizontal direction), and M pixels are arranged in the second direction (for example, the vertical direction), the second feature amount may be N cumulative density values acquired by accumulating the density values of the M pixels in column. In a case where a binary image in which the density value of the character pixels is 1, and the density value of other pixels is 0 is used as the line image data, the cumulative density value of the second feature amount is equivalent to the number of the cumulated character pixels. In addition, similar to the first feature amount, the cumulative density value of the second feature amount may include two or more cumulative values in which a section (cumulative interval) for accumulating the density value of character pixels is divided into plural.

Figure 16A:
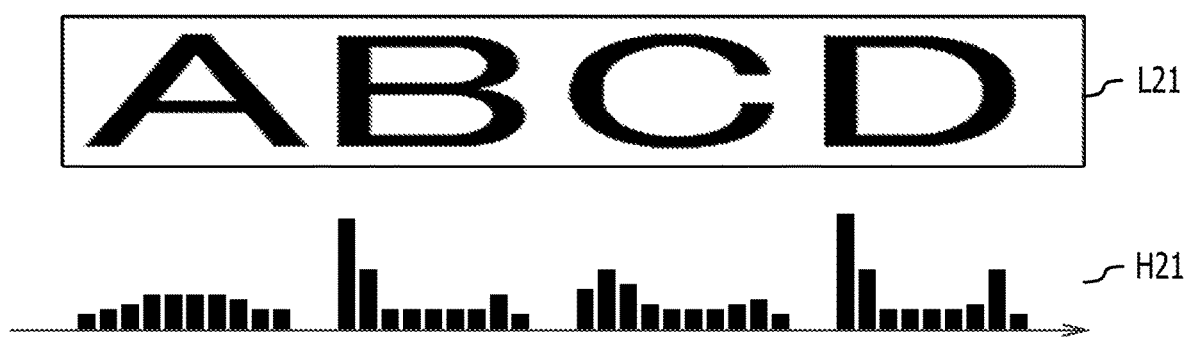
FIGS. 16A and 16B are diagrams illustrating an example of a second feature amount acquired from the second image data.
Figure 16B:
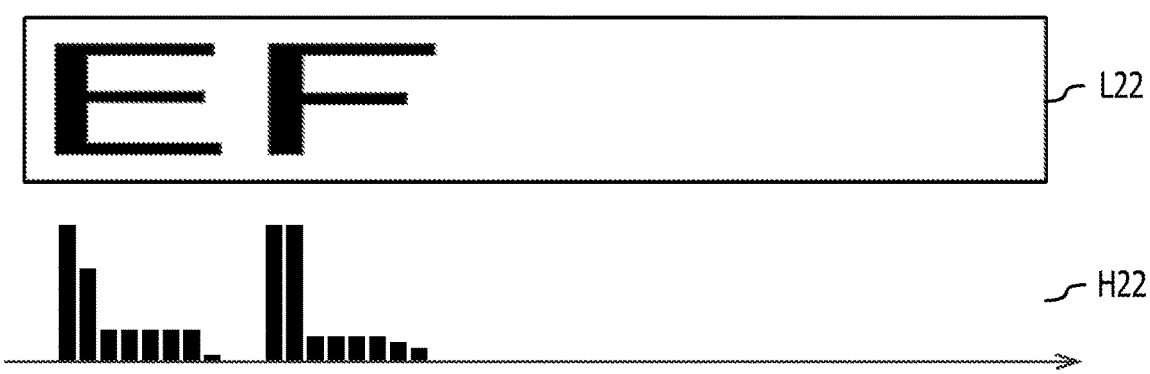

FIGS. 16A and 16B illustrate second feature amount H21 and second feature amount H22 of line image data L21 and line image data L22 acquired from the second image data C20 as illustrated in FIG. 7. That is, the line image data L21 illustrated in FIG. 16A has a character pixel in which the string "ABCD" is drawn, and the processor 1 acquires a histogram H21 which is the second feature amount of line image data L21 by projecting character pixels of line image data L21 along the X axis direction (horizontal direction) which is the first axis direction. In the same way, the line image data L22 as illustrated in FIG. 16B has character pixels in which the string of "EF" is drawn, and the processor 1 acquires a histogram H22 which is the second feature amount of line image data L22 by projecting the character pixels of line image data L22 along the X axis direction which is the first direction. Similar to the example of FIG. 13, the histogram H21 and the histogram H22 in the examples of FIGS. 16A and 16B may have, for example, a data structure in which the information of the cumulative density value is stored corresponding to the coordinate value on the X axis where each accumulated pixel array is positioned. In addition, since the content example in the case where the cumulative interval of the second feature amount is divided into plural is substantially the same as the example of the first feature amount illustrated in FIG. 14A to FIG. 14D, the description using the drawings is not repeated. Note that, the line image data and the histogram illustrated in FIGS. 16A and 16B are merely for the sake of convenience in describing Example 1, the correspondence relationship between each pixel array and the histogram of the line image data illustrated in FIGS. 16A and 16B may not be drawn in a strict correspondence.

The process returns to the description of FIG. 5. The processor 1 acquires a correspondence relationship of the character pixels of the first image data and the second image data in the first direction by comparing the first feature amount (feature amount of the first image) acquired in the process S107 and the second feature amount (feature amount of the second image) acquired in the process S108 (S109). The process S109 is an example of the process realized by causing the processor 1 to execute the correspondence relationship acquiring process 216 of the program for character recognition 21. In the process S109, for example, correspondence relationship of the character pixels of the first image data and the second image data in the first direction is searched by using a DP matching method. In the DP matching, a route searching operation is performed so as to minimize the cumulative value of cost corresponding to the similarity (for example, the difference of the density value) between the pixels of the first image data and the second image data in the first direction.

Figure 17:
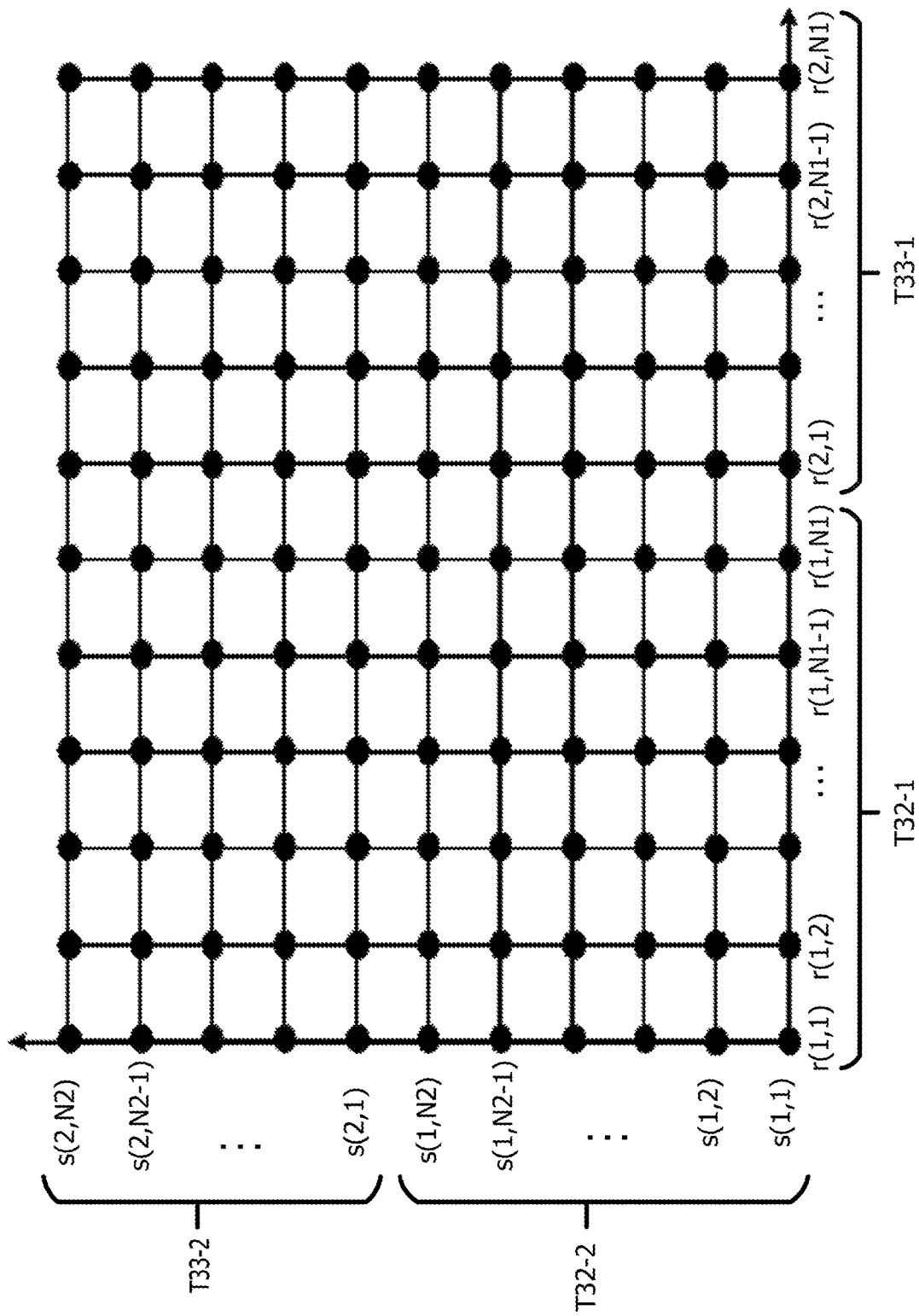
FIG. 17 is a diagram illustrating an example of a DP matching processing step of the first feature amount and the second feature amount.

FIG. 17 is a diagram illustrating an example of a DP matching processing step of the feature amount (first feature amount) of the first image and the feature amount (second feature amount) of the second image. On the horizontal axis in FIG. 17, a first feature amount T32-1 acquired from the line image data which is the first line element on the first image is disposed in a range of r (1, 1) to r (1,N1) in order of the coordinate values on the X axis of the line image data, and a first feature amount T33-1 acquired from the line image data which is the second line element on the first image is disposed in a range of r (2,1) to r (2,N1) in order of the coordinate values on the X axis of the line image data. Here, N1 indicates the number of the pixel arrays of each of the line images on the first image, and is equivalent to the value indicating the width (length of the horizontal axis direction) of the first image. On the vertical axis of FIG. 17, a second feature amount T32-2 acquired from the line image data which is the first line element on the second image is disposed in a range of s (1,1) to s (1,N2) in order of the coordinate values on the X axis of the line image data, and a second feature amount T33-2 acquired from the line image data which is the second line element on the second image is disposed in a range of s (2,1) to s (2,N2) in order of the coordinate values on the X axis of the line image data. Here, N2 indicates the number of the pixel arrays of each of the line images on the second image, and is equivalent to the value indicating the width (length of the horizontal axis direction) of the second image. Note that, the feature amounts illustrated FIG. 17 are associated with the coordinate values on the X axis of the line image data as the example of the data structure as illustrated in FIG. 13. For example, the first feature amount r (1,N1) indicates a feature amount of the pixel array in which the coordinate values on the X axis are arranged corresponding to an N1-th position (end position) among the pixel arrays of the line image data which is the first line element on the first image. The first feature amount r (2,1) indicates a feature amount of the pixel array in which the coordinate values on the X axis are arranged corresponding to the first position among the pixel arrays of the line image data which is the second line element on the first image. In other words, there is a line image data boundary on the first image between the first feature amount r (1,N1) and the first feature amount r (2,1) in FIG. 17. In the same way, the second feature amount s (1,N2) indicates a feature amount of the pixel array in which the coordinate values on the X axis are arranged corresponding to a N2-th position (end position) among the pixel arrays of the line image data which is the first line element on the second image. The second feature amount s (2,1) indicates a feature amount of the pixel array in which the coordinate values on the X axis are arranged corresponding to the first position among the pixel arrays of the line image data which is the second line element on the second image. In other words, there is a line image data boundary on the second image between the second feature amount s (1,N2) and the second feature amount s (2,1) in FIG. 17.

A black circle (lattice point) illustrated in FIG. 17 indicates a distance d (similarity distance d) indicating the similarity of the first feature amounts T32-1 and T33-1 disposed on the horizontal axis and the second feature amounts T32-2 and T33-2 disposed on the vertical axis. In the process S109, the processor 1 calculates a difference value between each of the first feature amounts T32-1 and T33-1 and each of the second feature amounts T32-2 and T33-2, and the absolute value of the above difference may be set as the similarity distance d. The similarity distance d (k,i,l,j) between a feature amount r (k,i) acquired from i-th (i is an integer of one or more) pixel array of k-th (k is an integer of one or more) line element on the first image, a feature amount s (l,j) acquired from j-th (j is an integer of one or more) pixel array of l-th (l is an integer of one or more) line element on the second image is, for example, represented by Equation (1).

$$d(k,i,l,j) = |r(k,i) - s(l,j)| \qquad (1)$$

When the number of line elements on the first image is set as K, and the number of the pixel arrays of each line image on the first image is set as N1, K×N1 lattice points are arranged in the horizontal axis direction in which the feature amount of the first image is disposed. In addition, when the line element on the second image is set as L, and the number of the pixel arrays of each line image on the second image is set s N2, L×N2 lattice points are arranged in the vertical axis direction in which the feature amount of the second image is disposed. Therefore, when an index value of the lattice point in the horizontal axis direction is set as x {x=1, K×N1} (first index value), an index value in the vertical axis direction is set as y {y=1, L×N2} (second index value), Equation (1) is represented by Equation (2). Note that, in Equation (2), "a mod n" indicates a remainder operation for obtaining a remainder obtained by dividing value a by value n.

$$d(x, y) = \left| r\left(\left\lceil \frac{x}{N1} \right\rceil, x \bmod N1\right) - s\left(\left\lceil \frac{y}{N2} \right\rceil, y \bmod N2\right) \right| \qquad (2)$$

Figure 18:
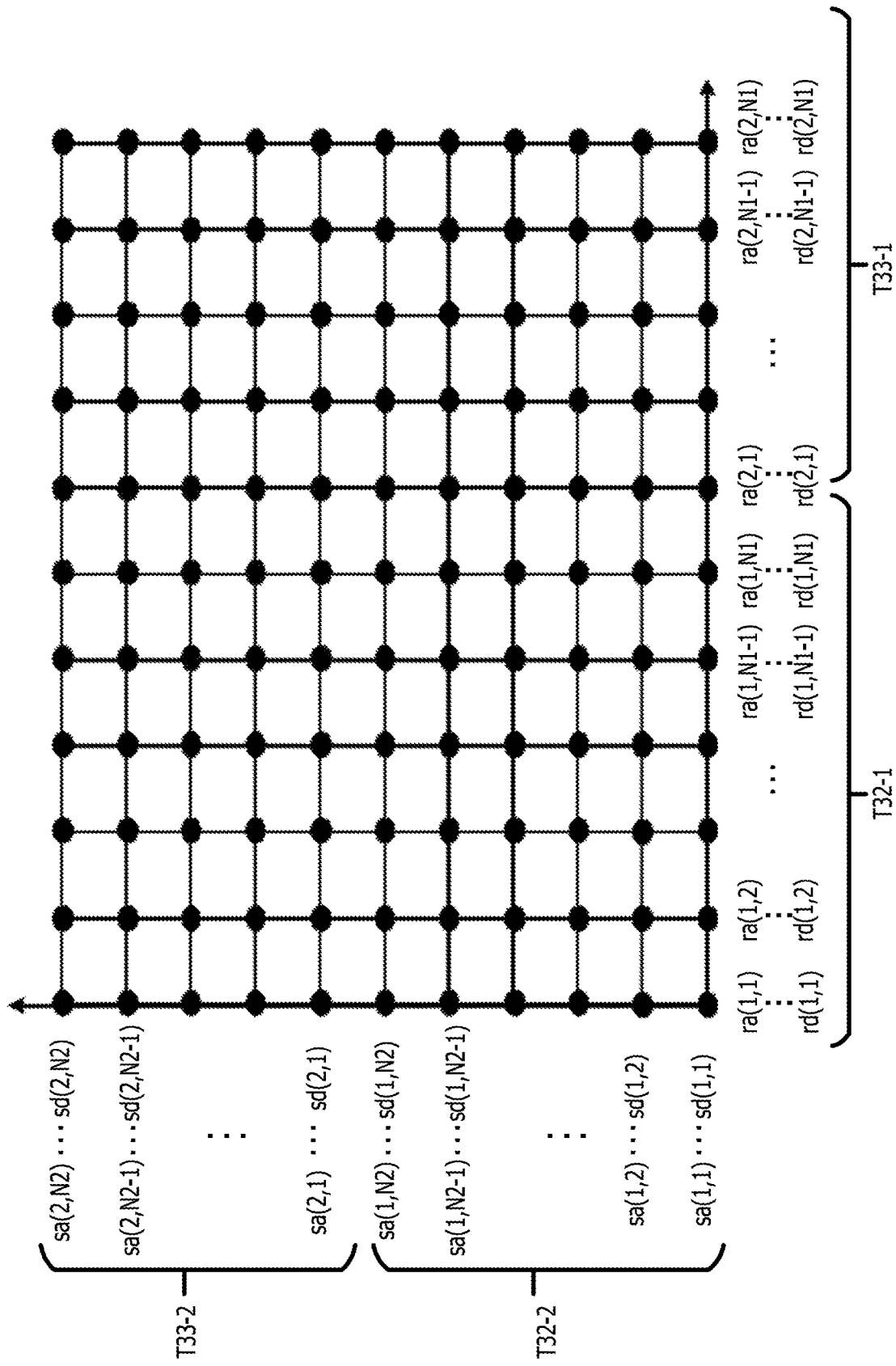
FIG. 18 is a diagram illustrating an example of a DP matching processing step using the feature amount acquired for each partial area of line image data.

FIG. 18 is a diagram illustrating an example of a DP matching processing step using the feature amount acquired for each partial area of line image data. FIG. 18 illustrates an example of a DP matching processing step of the feature amount (first feature amount) of the first image and the feature amount (second feature amount) of the second image which are acquired for each partial area where the line image data is divided into four sections. Similar to FIG. 17, on the horizontal axis of FIG. 18, the first feature amount T32-1 acquired from the line image data which is the first line element on the first image and the first feature amount T33-1 acquired from the line image data which is the second line element are disposed in order of the coordinate values on the X axis. Similar to FIG. 17, on the vertical axis of FIG. 18, the second feature amount T32-2 acquired from the line image data which is the first line element on the second image and the second feature amount T33-2 acquired from the line image data which is the second line element are disposed in order of the coordinate values on the X axis. Here, in the example of FIG. 18, the first feature amounts T32-1 and T33-1 have feature amounts ra to rd acquired from the partial areas obtained by equally dividing the line image data into four areas in the Y axis direction. Similarly, the second feature amounts T32-2 and T33-2 have feature amounts sa to sd rd acquired from the partial areas obtained by equally dividing the line image data into four areas in the Y axis direction. Note that, each of the feature amounts illustrated in FIG. 18 is associated with the coordinate values on the X axis of the line image data similar to the example of the data structure as illustrated in FIG. 15. For example, the four first feature amounts ra (1,N1), rb (1,N1), re (1,N1), and rd (1,N1) indicate feature amounts of the pixel arrays in which the coordinate values on the X axis are arranged corresponding to the end position among the pixel arrays of the line image data which is the first line element on the first image. Similarly, the four second feature amounts sa (2,N2), sb (2,N2), sc (2,N2), and sd (2,N2) indicate the feature amounts of the pixel arrays in which the coordinate values on the X axis are arranged corresponding to the end position among the pixel arrays of the line image data which is the second line element on the second image. In this example, four divisions are described as an example, but the number of the divisions may be two or more arbitrary integral numbers.

Similar to FIG. 17, a black circle (lattice point) illustrated in FIG. 18 indicates a distance d (similarity distance d) indicating the similarity of the first feature amounts T32-1 and T33-1 disposed on the horizontal axis and the second feature amounts T32-2 and T33-2 disposed on the vertical axis. In the process S109, the processor 1 calculates a difference value between each of the first feature amounts T32-1 and T33-1 and each of the second feature amounts T32-2 and T33-2, and the absolute value of the above difference may be set as the similarity distance d. For example, the similarity distance of the pixel array unit of the first feature amount and the second feature amount may be calculated for each divided area, and the value acquired by summing the similarity distances of each divided area may be used as the similarity distance of the pixel array unit. That is, the similarity distance d (k,i,l,j) between a feature amount r (k,i) acquired from i-th pixel array of k-th line element on the first image, a feature amount s (l, j) acquired from j-th pixel array of l-th line element on the second image is, for example, represented by Equation (3).

$$d(k,i,l,j) = |ra(k,i) - sa(l,j)| + |rb(k,i) - sb(l,j)| + |rc(k,i) - sc(l,j)| + |rd(k,i) - sd(l,j)| \quad (3)$$

When the number of line elements on the first image is set as K, and the number of the pixel arrays of each line image on the first image is set as N1, K×N1 lattice points are arranged in the horizontal axis direction in which the feature amount of the first image is disposed. In addition, when the line element on the second image is set as L, and the number of the pixel arrays of each line image on the second image is set s N2, L×N2 lattice points are arranged in the vertical axis direction in which the feature amount of the second image is disposed. Therefore, when an index value of the lattice point in the horizontal axis direction is set as x {x=1, K×N1} (first index value), an index value in the vertical axis direction is set as y {y=1, L×N2} (second index value), Equation (3) is represented by Equation (4). Note that, in Equation (4), "a mod n" indicates a remainder operation for obtaining a remainder obtained by dividing value a by value n.

$$d(x, y) = \left|ra(\lceil \tfrac{x}{N1} \rceil, x \bmod N1) - sa(\lceil \tfrac{y}{N2} \rceil, y \bmod N2)\right| + \quad (4)$$
$$\left|rb(\lceil \tfrac{x}{N1} \rceil, x \bmod N1) - sb(\lceil \tfrac{y}{N2} \rceil, y \bmod N2)\right| +$$
$$\left|rc(\lceil \tfrac{x}{N1} \rceil, x \bmod N1) - sc(\lceil \tfrac{y}{N2} \rceil, y \bmod N2)\right| +$$
$$\left|rd(\lceil \tfrac{x}{N1} \rceil, x \bmod N1) - sd(\lceil \tfrac{y}{N2} \rceil, y \bmod N2)\right|$$

In the process S109, the processor 1 calculates the similarity distance between the feature amount (first feature amount) of the first image and the feature amount (second feature amount) of the second image, then calculate minimum cumulative distance value until it reaches each lattice point, and stores the calculated minimum cumulative distance value and the lattice point (back pointer) on the route immediately before indicating the minimum cumulative distance up to each lattice point, for each lattice point. The minimum cumulative distance D (x,y) up to a certain lattice point (x,y) is represented by Equation (5), for example.

$$D(x, y) = \min \begin{cases} D(x-1, y) + d(x, y) + p(x-1, y, x, y) \\ D(x, y-1) + d(x, y) + p(x, y-1, x, y) \\ D(x-1, y-1) + d(x, y) + p(x-1, y-1, x, y) \end{cases} \quad (5)$$

In Equation (5), P (a,b,c,d) represents an example of movement cost (penalty) added to the cumulative distance in a case where transition is performed from the lattice point (a,b) to the lattice point (c,d). In the example represented by Equation (5), p (x−1,y,x,y) represents the movement cost (penalty) in a case where only one lattice point of the operation target is moved to the horizontal axis. In other words, P (x−1,y,x,y) means the movement cost (penalty) for comparing the feature amounts of the first image which are arranged on the horizontal axis with the feature amount of the second image by contracting (falling off) one of the feature amounts of the first image. p (x,y−1,x,y) indicates the movement cost (penalty) in a case where only one lattice point of the operation target is moved to the vertical axis. In other words, p (x,y−1,x,y) means the movement cost (penalty) for comparing the feature amounts of the first image which are arranged on the horizontal axis with the feature amounts of the second image by expanding (inserting) one of the feature amounts of the first image. p (x−1,y−1,x,y) indicates the movement cost (penalty) in a case where one lattice point of the operation target is moved to the vertical axis and the horizontal axis. In other words, p (x−1,y−1,x,y) means the movement cost (penalty) in a case where the feature amount is not expanded when comparing feature amount of the second image with the feature amounts of the first image arranged in the horizontal axis. The value of the movement cost (penalty) may be appropriately adjusted, and for example, the movement cost (penalty) for the transition with expansion and contraction may be set as 1, and the movement cost (penalty) for the transition without expansion and contraction may be set as 0. In addition, a gradient limitation may be provided based on a known method in Equation (5).

As described above, the processor 1 may calculate the minimum cumulative distance from the lattice point (1,1) which is a start point and store the minimum cumulative distance and the back pointer for each of the lattice points on the route up to the lattice point (K×N1,L×N2) which is an end point. Note that, a value of 0 may use as the start point of the minimum cumulative distance D (1,1) similar to the normal DP matching process algorithm. The processor 1 acquires the minimum cumulative distance D of the lattice points on the route from the start point to the end point and the back pointer of the lattice point, and thereby it is possible to acquire the shortest route (correspondence relationship between the character pixels on the first direction of the first image data and the second image data) on which the cumulative distance becomes minimum (S109).

The process returns to the description of FIG. 5. The processor 1 specifies the position on the second image corresponding to the newline position on the first image based on the correspondence relationship acquired in the process S109, and inserts a newline code to the character recognition result of the specified position (S110). In the process S110, the processor 1 is an example of the process realized by causing the processor 1 to execute the newline position determining process 217 of the program for character recognition 21. For example, in the process 110, the processor 1 refers to the lattice point on the shortest route by referring to the lattice point indicated by the back pointer of the end point and further tracing back to the lattice point indicated by the back pointer indicated as the lattice point so as to specify the lattice point at which the index value x (first index value) in the horizontal axis direction is a value obtained by multiplying the number N1 of pixel arrays of each line element on the first image by an integer. The lattice point at which the index value x (first index value) in the horizontal axis direction is a value obtained by multiplying the number N1 of pixel arrays of each line element on the first image by an integer corresponds to the end position in the first direction of the line element (line image) on the first image. Since the end of the line element in the first direction corresponds to the newline position, the processor 1 may specify the position of the pixel array on the second image corresponding to the newline position on the first image by referring to the lattice point at which the index value x (first index value) in the horizontal axis direction is a value obtained by multiplying the number N1 of pixel arrays of each line element on the first image by an integer. Note that, K×N1-th lattice point may be excluded from the target to be specified. The reason for this is that K×N1-th lattice point corresponds to the end position of the last line element among the line elements on the first image, and a newline is not present in a string drawn by the character pixels contained in the last line element.

Figure 19:
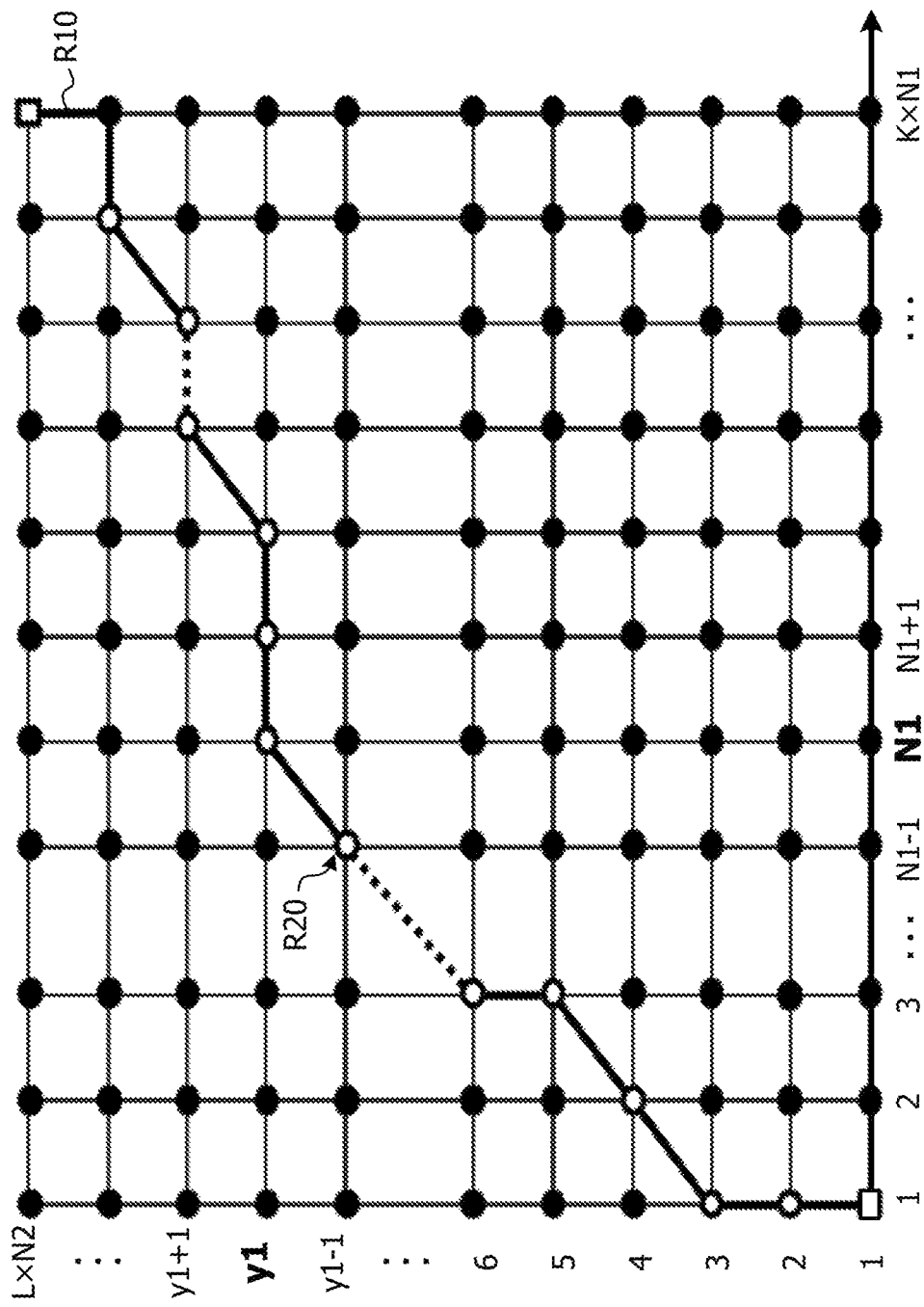
FIG. 19 is a diagram illustrating an example of a correspondence relationship of a lattice point on the shortest route acquired by the DP matching process and an end position of a line element on the first image.

FIG. 19 is a diagram illustrating an example of the correspondence relationship of the lattice point on the shortest route acquired by the DP matching process and the end position of the line element on the first image. In FIG. 19, when assuming that the number of line elements on the first image is set as K, and the number of the pixel arrays of each line image on the first image is set as N1, the first feature amounts of K×N1 pixel arrays are arranged in the horizontal axis direction. In addition, when assuming that the number of line elements on the second image is set as L, and the number of the pixel arrays of each line image on the first image is set as N2, the second feature amounts of L×N2 pixel arrays are arranged in the vertical axis direction. In FIG. 19, a lower left corner rectangle indicates the start point (1,1), an upper right corner rectangle indicates the end point (K×N1,L×N2), and a circles indicate the lattice point of the on the shortest route from the start point to the end point. Note that, a broken line connecting the lattice points of the on the shortest route indicates that one or more lattice points are not illustrated in the drawings.

In FIG. 19, it is possible to acquire the lattice points on the shortest route up to the start point (1,1) by tracing back from the lattice points on the shortest route R10 indicated by the back pointer of the end point (K×N1,L×N2). Each of the lattice points on the shortest route R10 indicates an optimal correspondence relationship of the character pixels of the first image data and the second image data in the first direction. For example, a lattice point R20 on the shortest route in which the first index value which is the index value in the horizontal axis direction is positioned at N1-th position indicates correspondence relationship between the N1-th pixel array of the first line element on the first image and the pixel array on the second image which has similar feature amounts to the pixel array on the first image. Since the end of the line element in the first direction corresponds to the newline position, and thus in a case where each line element on the first image has N1 pixel array in the first direction, the lattice point at which the first index value is an integral multiple of N1 may indicate the pixel array on the second image corresponding to the newline position on the first image. In the process 110, the processor 1 may specify among the lattice points on the shortest route, the pixel array on the second image corresponding to the end pixel array of the line element on the first image by referring to the lattice point R20 in which the first index value is an integral multiple of N1. In a case where there is a plurality of the lattice points corresponding to the end pixel array of the line element on the first image, the lattice point at which the second index value which is the index value in the vertical axis direction is the minimum may be selected as the lattice point of the newline position. For example, the processor 1 may select the lattice point at which the second index value is the minimum as the lattice point of the newline position in a case where a plurality of lattice points at which the first index value is N1 are detected. Note that, in FIG. 19, a second index value y1 indicated by the lattice point R20 may be converted into an index value l of the line element (line image data) on the second image, and an index value j of the pixel array on the line image data by using Equation (6) and Equation (7). In addition, N2 indicates the number of the pixel arrays of each of the line elements on the second image in the first direction.

$$l = \left\lceil \frac{y1}{N2} \right\rceil \quad (6)$$

$$j = y1 \bmod N2 = y1 - N2 \left\lfloor \frac{y1}{N2} \right\rfloor \quad (7)$$

In the process S110, the processor 1 acquires the index value l of the line element on the second image corresponding to the newline position on the first image and the index value j of the pixel array in the line element, then deletes the information element in which the character code corresponding to the newline code is set from the information elements of character recognition result information by referring to the character recognition result information acquired in the process S105, and inserts the information element in which the newline code is set to the position corresponding to the newline position on the first image.

Based on the index value l of the line element on the second image corresponding to the newline position on the first image and the index value j of the pixel array in the above line element, as a method of specifying an insertion position of the newline position in the recognition result information, various methods may be used. For example, the processor 1 may specify a character frame which is disposed immediately before the pixel array specified by the index values (l,j) in the direction in which the characters are arranged by referring to character frame information of each character element included in the recognition result information, and then by matching the position of the character frame on the second image specified by each character frame information with the position of the pixel array of the line element on the second image specified by index values (l,j). For example, by referring to line area information T40 of the second image data generated in the process S106, the processor 1 acquires the line element, which is referred to by the index value I on the second image which corresponds to the newline position on the first image, specified in the process S110 from the line area information. In addition, the processor 1 specifies character frame information in which the Y coordinate value at the character frame position which is set as character frame information in each character element of the recognition result information T10 approximates to the upper end Y coordinate value of the line element of the index value I. For example, in a case where a difference between the Y coordinate value at the character frame position which is set as the character frame information and the upper end Y coordinate value of the line element of the index value I is less than a predetermined threshold, the processor 1 may determine that both are approximate. As the predetermined threshold, an arbitrary value smaller than the height (length in the vertical direction) of the line area may be set. In addition, among the above specified pieces of character frame information, the processor 1 selects the character frame information whose value obtained by adding the width of the character frame to the X coordinate value at the character frame position of the character frame information is closest to the index value j on the second image corresponding to the newline position on the first image. The processor 1 may insert the character element in which the newline code is set to the position next to the character element having the selected character frame information. In other words, the newline code corresponding to the newline position on the second image may be deleted from the character recognition result acquired from the second image and the newline code corresponding to the newline position on the first image may be inserted to the character recognition result.

As a modification of the method of specifying the insertion position of the newline position in the recognition result information based on the index values (l,j), the processor 1 may specify the newline position by acquiring a second character recognition result from an image formed of a plurality of pixel arrays from the pixel array specified by the index values (1,1) to the pixel array specified by the index values (l,j) through the character recognition process 231 of the image processing program 23, and matching the character recognition result (first character recognition result) acquired in the process S105 with the second character recognition result so as to specify a range coincident with the second character recognition result in the first character recognition result.

Figure 20:
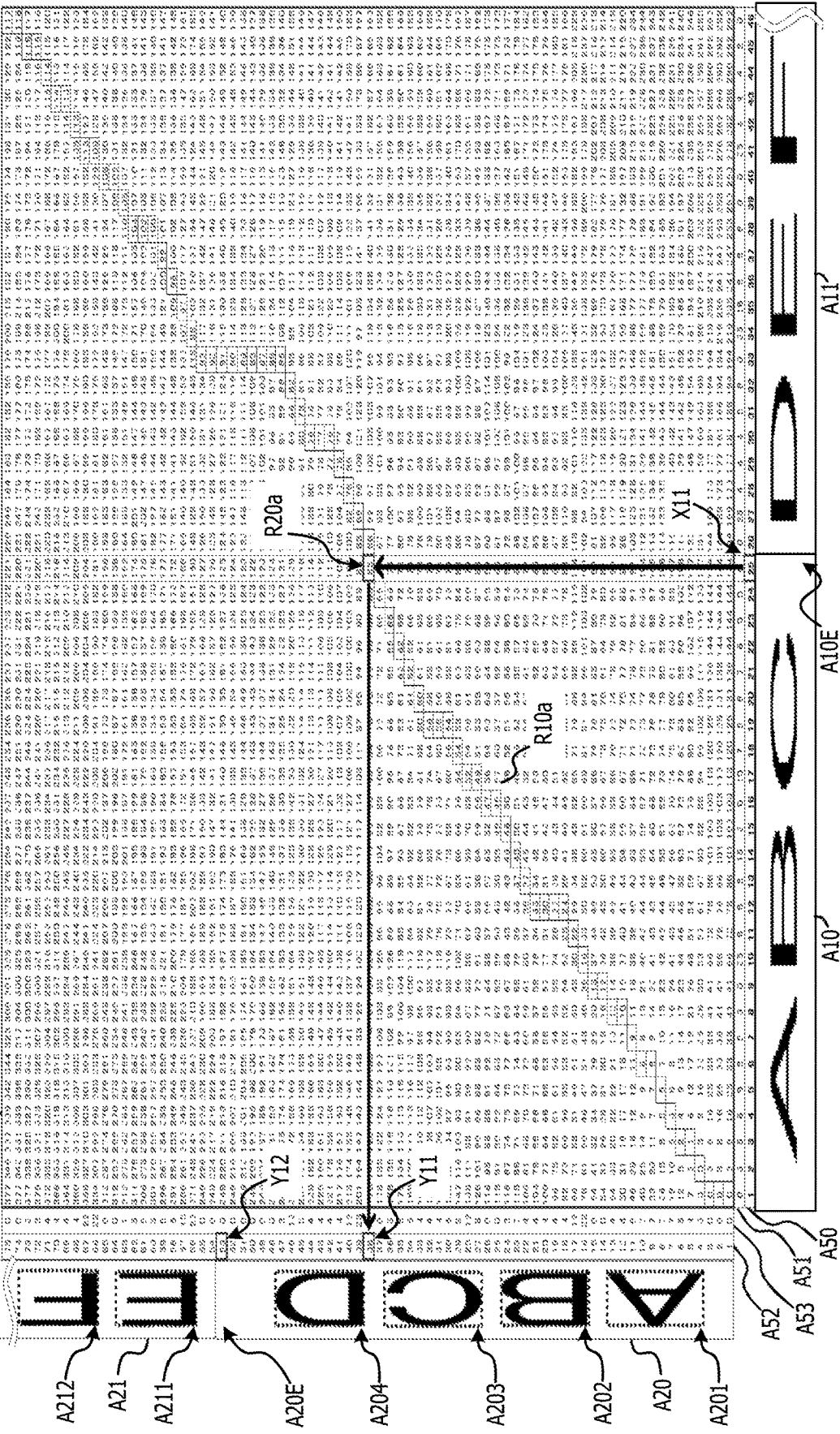
FIG. 20 is a diagram (Part 1) illustrating an example of a process of specifying the correspondence relationship of pixel arrays between the first image and the second image via the lattice point on the shortest route acquired by the DP matching process.

FIG. 20 is a diagram illustrating an example of a process of specifying the correspondence relationship of pixel arrays between the first image and the second image via the lattice point on the shortest route acquired by the DP matching process. In FIG. 20, similar to FIG. 19, when assuming that the number of line elements on the first image is set as K, and the number of the pixel arrays of each line image on the first image is set as N1, the first feature amounts of K×N1 pixel arrays are arranged in the horizontal axis direction. In addition, when assuming that the number of line elements on the second image is set as L, and the number of the pixel arrays of each line image on the first image is set as N2, the second feature amounts of L×N2 pixel arrays are arranged in the vertical axis direction. Here, in FIG. 20, the number of line elements K on the first image is 2, the number of line elements L on the second image is 2. In addition, in FIG. 20, some of the pixel arrays of the first image and the second image are not illustrated.

K×N1 pixel arrays arranged in the horizontal axis direction in FIG. 20 include a portion corresponding to line image data A10 having the character pixels for drawing a string "ABC" at the first magnification, and a portion corresponding to line image A11 having the character pixels for drawing a string "DEF" at the first magnification. Further, L×N2 pixel arrays arranged in the vertical axis direction in FIG. 20 include a portion corresponding to line image data A20 having the character pixels for drawing a string "ABCD" at the second magnification, and a portion corresponding to line image A21 having the character pixels for drawing a string "EF" at the second magnification. In the line image A20, character frames A201 to A204 of the character recognition result are illustrated. In addition, in the line image A21, character frames A211 to A212 of the character recognition result are illustrated.

In the horizontal axis direction of FIG. 20, a first feature amount A51 of each pixel array is indicated corresponding to the first index value x {x=1, . . . , K×N1} A50 of K×N1 pixel array in the line image data on the first image. In addition, in the vertical axis direction of FIG. 20, a second feature amount A53 of each pixel array is indicated corresponding to the second index value y{y=1, . . . , L×N2} A52 of L×N2 pixel array in the line image data on the second image. Note that, the values of the first feature amount A51 and the second feature amount A53 as illustrated in FIG. 20 are merely an example set for the description of Example 1, and may not reflect an accurate calculation result.

In FIG. 20, the processor 1 calculates a minimum cumulative distance A40 in each lattice point based on the similarity distance d between the first feature amount of K×N1 pixel arrays arranged in the horizontal axis direction and the second feature amount of L×N2 pixel arrays arranged in the vertical axis direction, and then specifies the shortest route A30 based on the minimum cumulative distance A40 of each lattice point. The shortest route R10a in FIG. 20 is illustrated by surrounding the minimum cumulative distance value of the lattice point positioned on the shortest route R10a tracing from the lower left to the upper right in the minimum cumulative distance A40 in each lattice point with a rectangle. Note that, the minimum cumulative distance A40 in each lattice point and the shortest route R10a in FIG. 20 are merely an example set for the description of Example 1, and may not reflect an accurate calculation result. The processor 1 may acquire a lattice point R20a specified by a first index value X11 of the pixel array corresponding to an end position A10E in the first direction of the line image A10 by referring to the first index value which is the index value of the lattice points on the shortest route R10a in the horizontal axis direction. Among the lattice points on the shortest route R10a, the lattice point R20a is a lattice point indicating a correspondence relationship between the first index value X11 and the second index value Y11. With this, the processor 1 may specify that the second index value Y11, which is different from the second index value Y12 of the pixel array corresponding to the end position A20E of the line image A20 on the second image in the first direction, corresponds to the newline position (first index value X11) on the first image.

Among the L×N2 pixel arrays on the second image arranged in the vertical axis direction, the processor 1 may specify the index value Y11 of the pixel array corresponding to the end position A10E of the line image A10 by referring to the second index value which is the index value of the lattice point R20a in the vertical axis direction. The processor 1 may convert the index value Y11 into the index value I of the line element on the second image, and the index value j of the pixel array on the line image data by using Equation (6) and Equation (7).

In FIG. 20, the processor 1 specifies character frame information in which a difference between the upper end Y coordinate value of a line element A20 and the Y coordinate value at the character frame position set as the character frame information of each character element in the recognition result information T10 is less than a predetermined threshold by referring to the line area information of the second image, and the line element A20 specified by the index value I which is converted from the index value Y11. As a result, in the example of FIG. 20, the character frame A201, the character frame A202, the character frame A203, and the character frame A204 are specified. Then, the processor 1 calculates the X coordinate value at a right end of the character frame by adding the width (length of the horizontal axis direction) of each character frame to the offset position of each of the specified character frame A201 to character frame A204. In addition, the processor 1 selects the character frame in which the X coordinate value at the right end of the character frame is the closest to the index value j converted from the index value Y11 among the character frame A201 to the character frame A204 which are specified above. As a result, in the example of FIG. 20, the character frame A203 is selected. The processor 1 inserts the character element in which the newline code is set to the position next to the character element having the character frame information on the selected character frame A203. That is, in the example of FIG. 20, the newline code is inserted between the character recognition result relating to the character frame A203 and the character recognition result relating to the character frame A204.

FIG. 21 is a diagram illustrating an example of the data structure of the recognition result information T10 illustrating the character recognition result after the newline position is converted in the example of FIG. 20. In the character recognition result acquired from the second image data, as illustrated in FIG. 9, a newline is made between the character "D" and the character "E" of the string "ABCDEF", and thus a character element indicating the newline code "0x0A" is stored immediately after the character element indicating the character code "0x44" corresponding to the character "D". However, as a result of converting the newline position so as to match the layout of the character pixel drawn in the first image, in the example as illustrated in FIG. 21, a character element T15a indicating the newline code "0x0A" is stored immediately after the character element T14 indicating the character code "0x43" corresponding to the character "C". The reason for this is that in the first image, a newline is made between the character "C" and the character "D" of the string "ABCDEF".

As described above, Example 1 is described. According to one aspect of Example 1, the newline code is inserted to the character recognition result acquired from the second image based on the position on the second image corresponding to the newline position on the first image. In other words, it is possible to correct the newline position in the character recognition result acquired from the second image to a position matching with the layout of the character pixels drawn in the first image. For this reason, it is possible to reflect the layout of the character pixels drawn at the first magnification to the character recognition result while improving the accuracy of the character recognition of the document image acquired from the display result of the browser screen capture function. With this, for example, when setting the display magnification that is supposed to be generally used as first magnification and setting the display magnification larger than the first magnification as second magnification, it is possible to improve the accuracy of the character recognition for performing the character recognition by using the character pixels with high resolution which are drawn at the second magnification, and it is possible to acquire a character code string having a newline made in a position matched with the layout of the character pixels drawn on the browser at the generally used display magnification. The character code string thus obtained is useful for, for example, automating cross-browser check. Alternatively, it is possible to provide a service that reads display contents of the browser with a synthesized voice, and it is useful for realizing it is useful for realizing natural reading matched with the display layout on the browser by expanding the reading interval in accordance with the newline position.

Example 2

Figure 22:
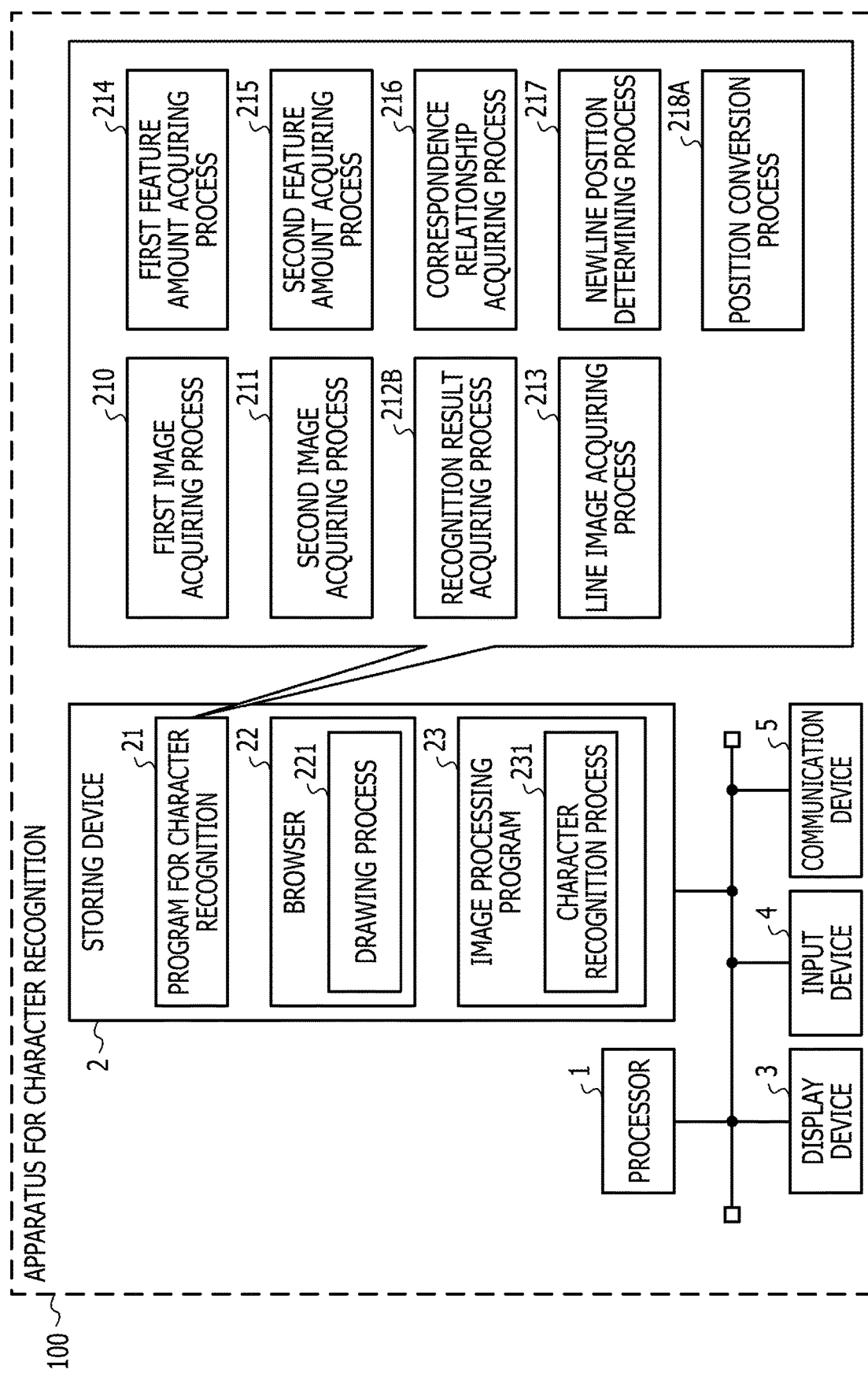
FIG. 22 is a diagram illustrating an example of a configuration of an apparatus for character recognition according to Example 2.

FIG. 22 is a diagram illustrating an example of a configuration of an apparatus for character recognition 100 according to Example 2. A configuration example of the apparatus for character recognition 100 as illustrated in FIG. 22 is different from the configuration example as illustrated in FIG. 1 in that it is provided with a position converting process 218A. The processor 1 of the apparatus for character recognition 100 according to Example 2 is configured to execute the position converting process 218A such that the position of the character frame in the character recognition result on the second image data is converted into the position on the first image data based on a correspondence relationship of the character pixels on the first image and the character pixels on the second image which is acquired through the process of the correspondence relationship acquiring process 216, and the ratio of (conversion rate) the first image to the second image.

Figure 23A:
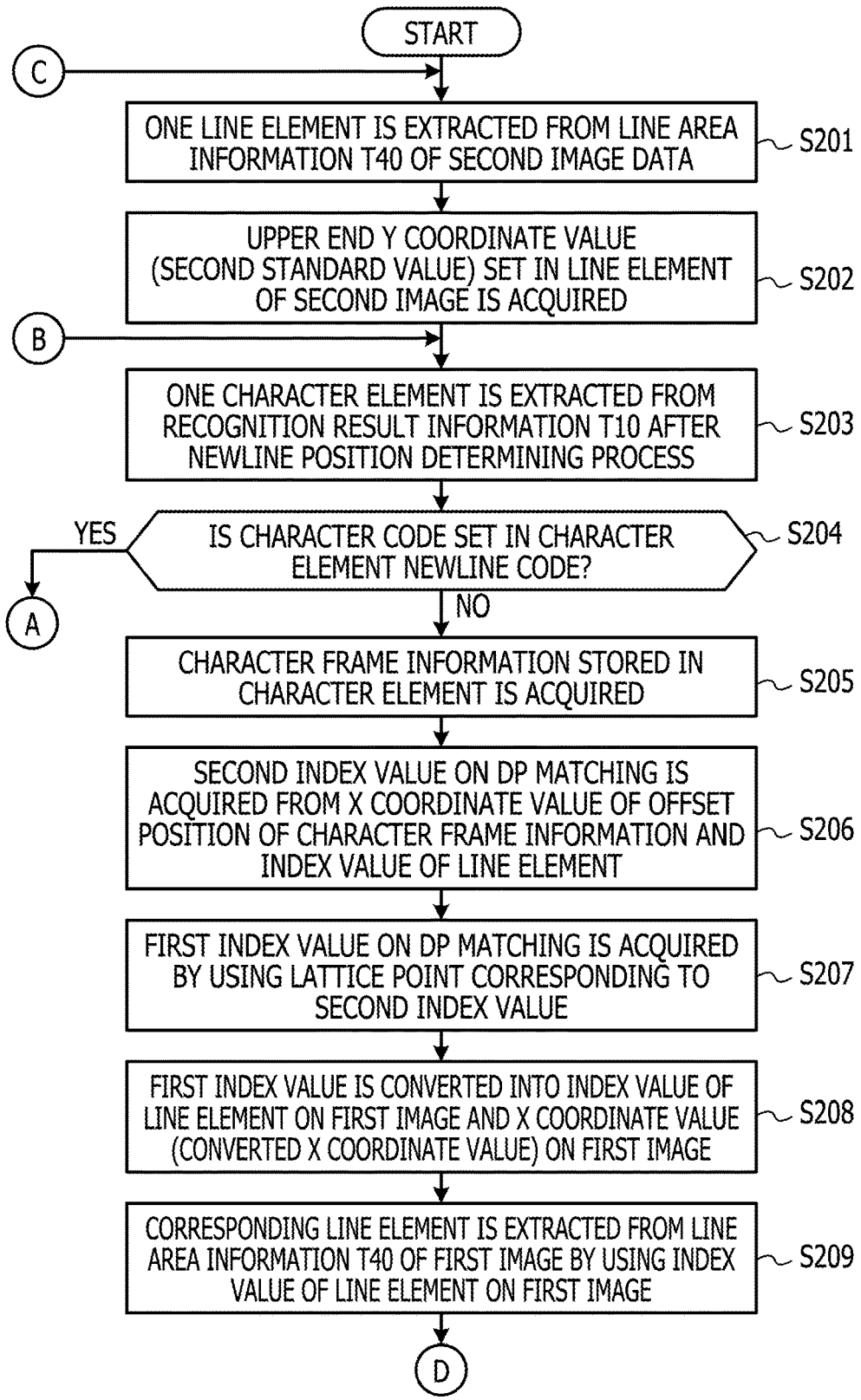
FIGS. 23A and 23B are a diagram illustrating an example of the flow of a position converting process according to Example 2.
Figure 23B:
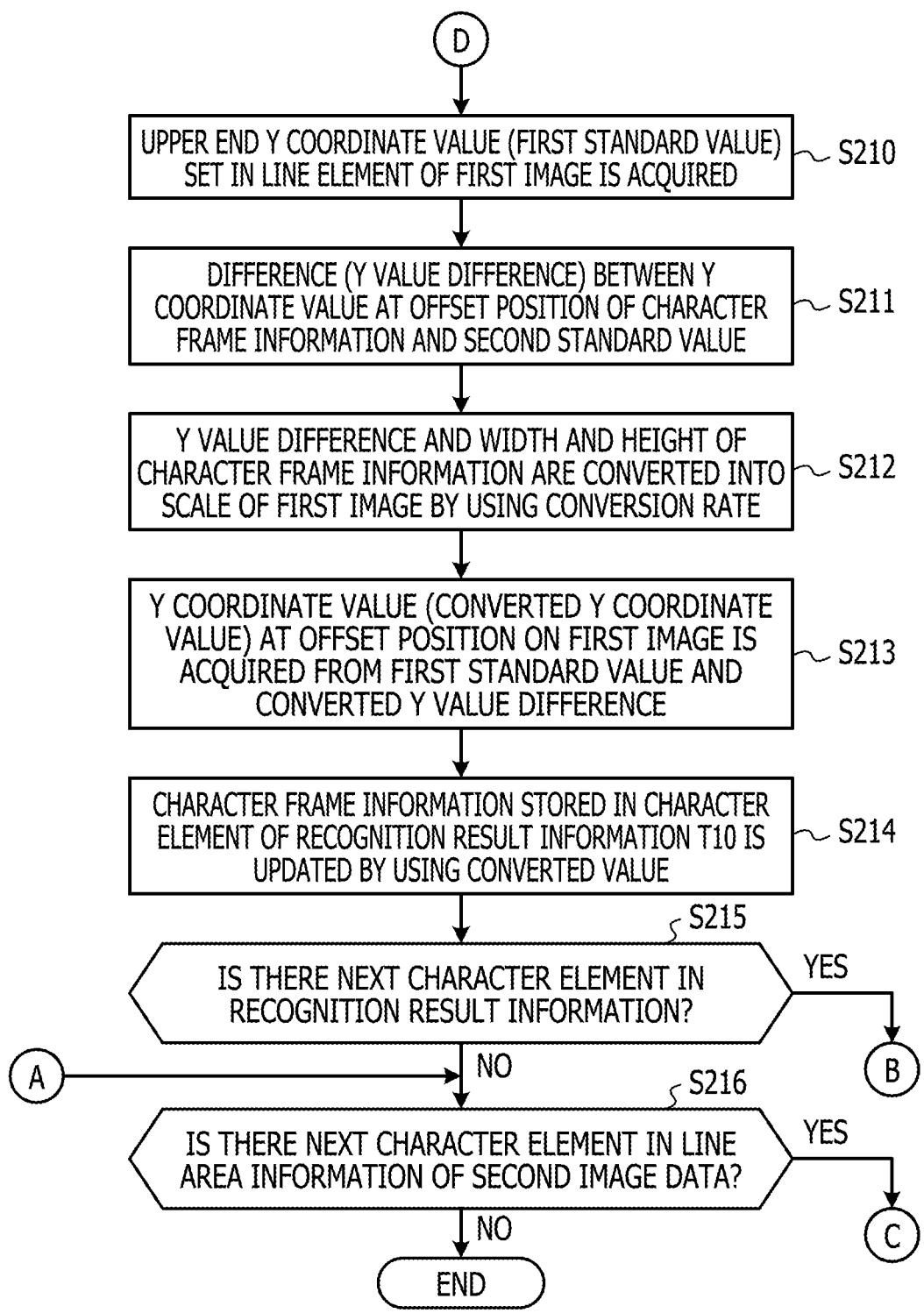

FIG. 23 (i.e. FIGS. 23A and 23B) is a diagram illustrating an example of the flow of the position converting process according to Example 2. The processor 1 of the apparatus for character recognition 100 according to Example 2 may start the execution of the position converting process illustrated in FIG. 23, for example, when the newline position of the character recognition result is adjusted through the character recognition process illustrated in FIG. 5. Alternatively, the processor 1 of the apparatus for character recognition 100 according to Example 2 may start the execution of the position converting process illustrated in FIG. 23, for example, when an input signal for causing the processor 1 to start the execution of the program for character recognition 21 is supplied from the input device 4 to the processor 1 in response to a user operation. At this time, in a case where the result of the character recognition process illustrated in FIG. 5 is not stored in the storing device 2, the processor 1 may operate such that the execution of the position converting process illustrated in FIG. 23 is started after the execution result of the character recognition process is acquired by starting the execution of the character recognition process illustrated in FIG. 5. In other words, when an input signal for causing the processor 1 to start the execution of the program for character recognition 21 is supplied from the input device 4 to the processor 1 in response to a user operation, in a case where the result of the character recognition process illustrated in FIG. 5 is stored in the storing device 2, the processor 1 according to Example 2 may operate such that the execution of the position converting process illustrated in FIG. 23 is started without execution of the character recognition process illustrated in FIG. 5.

The processor 1 extracts one of the line elements from the line area information T40 of the second image data (S201). Here, "extracting one of the line elements" means that one or more line elements stored in the line area information are referred to in order of index, and even after performing the process of "extracting one of the line elements line element", there is no effect on the number of line elements stored in line area information. That is, in the following description, "extracting one of the line elements" is the same meaning of "referring to the line element". The same is true for other information elements. In addition, an index value ind_l of the line element used at the time of referring to one or more of the line elements stored in the line area information in order of index values has an initial value of 1, and a value indicated in the element number T41 of the line area information T40 is an upper limit. In the flow of the position converting process illustrated in FIG. 23, there is one line element extracted from the line area information of the second image data in order of index values by one execution of process S201. In other words, every time the line element is extracted from the line area information of the second image data through the process S201, 1 is added to the index value ind_l of the line element.

The processor 1 acquires the upper end Y coordinate value (second standard value) set as the line element of the second image acquired in the process S201 (S202). Here, "upper end" in a variable name "upper end Y coordinate value" means an upper end of the line area in the coordinate system which is represented by two-dimensional coordinates in which when the upper left corner is set as the origin, the X coordinate value is increased as it goes to the right, and the Y coordinate value is increased as it goes downward. In other words, among the coordinates defining the outer edge of the line area, the minimum value of the Y coordinate corresponds to "upper end Y coordinate value".

The processor 1 extracts one of the character elements in order of index values from the recognition result information T10 after the newline position determining process in the process S110 illustrated in FIG. 5 (S203). In the process S203, regarding the index values of the character elements used when the processor 1 extracts the character elements from the recognition result information T10, an initial value is 1, and a value indicated in the element number T11 of the recognition result information T10 is an upper. In the flow of the position converting process illustrated in FIG. 23, there is one line element extracted from the recognition result information T10 in order of index values by one execution of process S203. In other words, every time the character element is extracted from the recognition result information T10 through the process S203, 1 is added to the index value of the character element.

The processor 1 compares the character code set in the character element with the newline code and determines whether or not the character code set in the character element is a newline code (S204). For example, the processor 1 may determine that in a case where the character code set in the character element does not match with the newline code, the character code set in the character element is not the newline code.

In the process S204, in the case where the character code set in the character element is not the newline code (NO in S204), the processor 1 acquires character frame information stored in the character element (S205). On the other hand, in the process S204, in a case where the character code set in the character element is the newline code (YES in S204), the processor 1 may execute a process S216 described later.

The processor 1 acquires a second index value ind_y on the DP matching from the X coordinate value ind_j of the character frame position of the character frame information acquired in the process S205 and the index value ind_l used at the time of extracting the line element in the process S201 by using Equation (8). Note that, N2 indicates the number of the pixel arrays of the line element of the second image data, and is equivalent to the value indicating the width (length of the horizontal axis direction) of the second image data.

$$ind\_y=(ind\_l-1) \times N2+ind\_j \tag{8}$$

Figure 24:
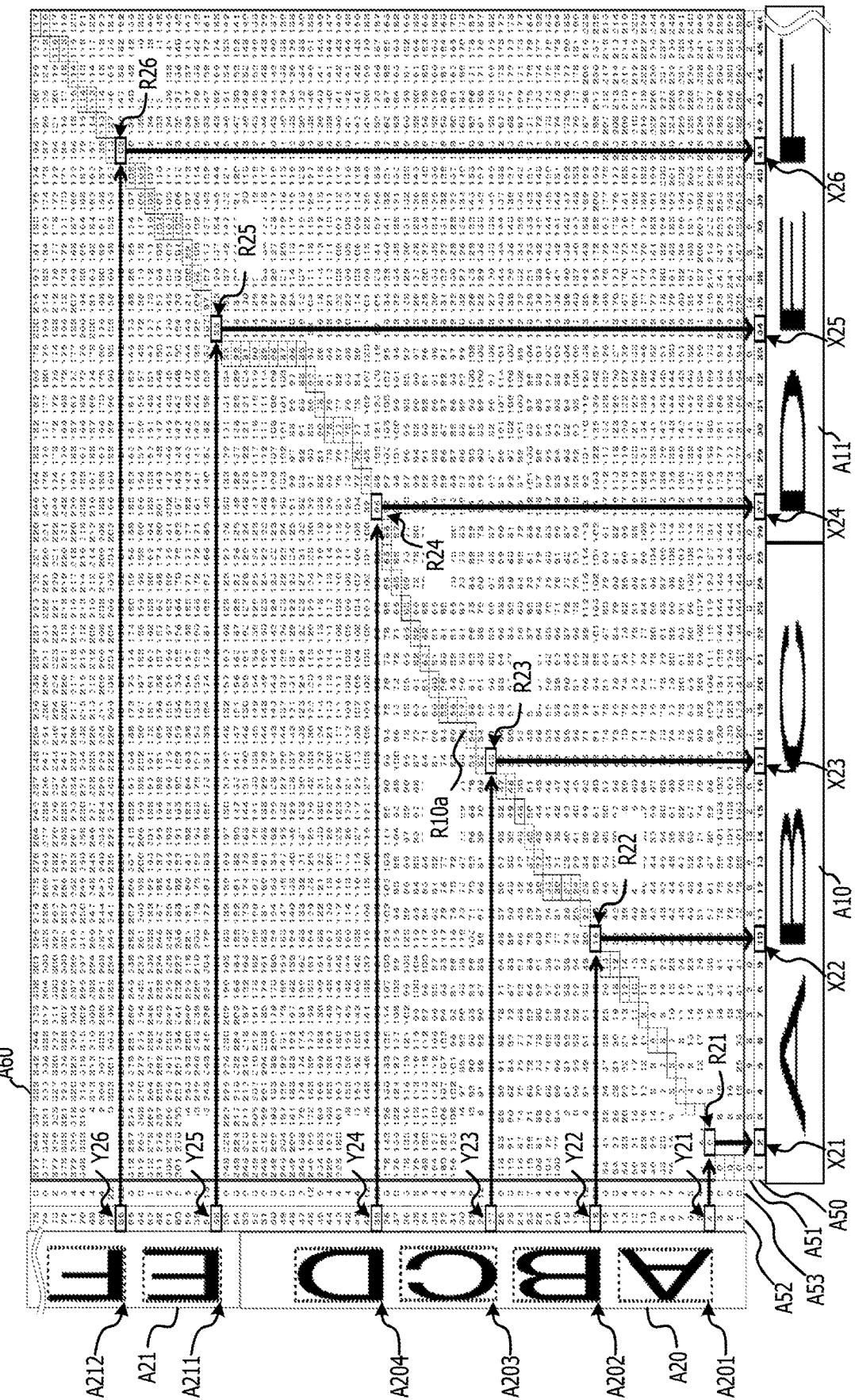
FIG. 24 is a diagram (Part 2) illustrating an example of a process of specifying the correspondence relationship of pixel arrays between the first image and the second image via the lattice point on the shortest route acquired by the DP matching process.

The processor 1 specifies a lattice point corresponding to the second index value by referring to the correspondence relationship acquired by the process S109 illustrated in FIG. 5 so as to acquire the first index value on the DP matching (S207). The operation of the process S207 will be described with reference to the drawings FIG. 24. Similar to the example of FIG. 20, FIG. 24 is a diagram illustrating an example of a process of specifying the correspondence relationship of pixel arrays between the first image and the second image via the lattice point on the shortest route acquired by the DP matching process. FIG. 24 illustrates second index values Y21 to Y26 acquired through the process S206 executed in the position converting process. Here, the second index value acquired through one execution of the process S206 is one of the second index values Y21 to Y26.

In the example of FIG. 24, the line elements acquired from the second image data are stored in order of the line element A20 and the line element A21 in the line area information T40. Further, the character elements acquired from the second image data are stored in order of the character element A201, the character element A202, the character element A203, the character element A204, the character element A211, and the character element A212 in the recognition result information T10. Here, the character elements of the newline code is inserted between the character element A203 and the character element A204 in the recognition result information T10 after the newline position determining process of the process S110 illustrated in FIG. 5.

In the example of FIG. 24, processor 1 acquires the line element A 20 from the line area information through the first execution of the first process S201 and acquires the character element A201 from the recognition result information through the first execution of the first process S203. The "first execution" indicates the number of times of execution in the series of flows from the start to the end of the process illustrated in FIG. 23. The "first execution" may be performed when the process illustrated in FIG. 23 is started after the process illustrated in FIG. 23 is completed. In the example of FIG. 24, the processor 1 acquires the character frame information stored in the character element A201 (S205), and acquires the second index value Y21 relating to the character element A201 by using the character frame position of the character frame information (S206). The processor 1 acquires a lattice point R21 corresponding to the second index value Y21 by referring to the correspondence relationship acquired through the process S109 illustrated in FIG. 5 (S207). In addition, the processor 1 acquires a first index value X21 corresponding to the second index value Y21 based on the correspondence relationship indicated by the lattice point R21. In FIG. 24, similar to the character element A201, a first index value X22 specified by using a lattice point R22 corresponding to the second index value Y22 of the character element A202, a first index value X23 specified by using a lattice point R23 corresponding to the second index value Y23 of the character element A203, a the first index value X24 specified by using a lattice point R24 corresponding to the second index value Y24 of the character element A204, a first index value X25 specified by using a lattice point R25 corresponding to the second index value Y25 of the character element A211, and a first index value X26 specified by using a lattice point R26 corresponding to the second index value Y26 of the character element A212.

The process returns to the description of FIG. 23. The processor 1 converts the first index value ind_x acquired in the process S207 into the index value ind_k of the line element on the first image and the X coordinate value ind_i on the first image by using Equation (9) and Equation (10) (S208).

$$\text{ind\_k} = \left\lceil \frac{\text{ind\_x}}{N1} \right\rceil \qquad (9)$$

$$\text{ind\_i} = \text{ind\_x} \bmod N1 = \text{ind\_x} - N1 \left\lfloor \frac{\text{ind\_x}}{N1} \right\rfloor \qquad (10)$$

The processor 1 extracts the corresponding line element from the line area information T40 from the first image data by using an index value ind_k of the line element on the first image acquired in the process S208 (S209). That is, the index value ind_k acquired in the process S208 is an index value indicating the line element on the first image to which the character element on the first image corresponding to the character element acquired in the process S203 belongs.

The processor 1 acquires the upper end Y coordinate value (first standard value) of the line element acquired in the process S209 (S210), and acquires a difference (Y value difference) between the Y coordinate value at the character frame position of the character frame information acquired in the process S205 and the first standard value (S211).

The processor 1 converts the Y value difference acquired in the process S211, and the width and the height of the character frame information acquired in the process S205 into the scale of the first image by using the conversion rate of the first image data and the second image data (S212). In the process S212, the conversion rate of the first image data and the second image data may be determined based on the ratio of the sum of the height of each line image (length in Y axis direction) acquired from the first image data and the sum of the height of each line image acquired from the second image data in a case where the second direction is the Y axis (vertical direction). Alternatively, the conversion rate of the first image data and the second image data may be determined based on the ratio of the first magnification and the second magnification which are the display magnifications set to the browser 22 in the process S101 and the process S103 illustrated in FIG. 5. In the process S212, as the conversion to the scale of the first image, the processor 1 performs an operation to reduce each value using the conversion rate, for example.

The processor 1 acquires the Y coordinate value (converted Y coordinate value) at the character frame position of the character frame on the first image by using the first standard value acquired in the process S210 and the converted Y value difference (S213). In other words, the converted Y coordinate value acquired in the process S213 corresponds to a value obtained by mapping the character frame position of the character frame information acquired in process S205 to the coordinate space on the first image.

Figure 25:
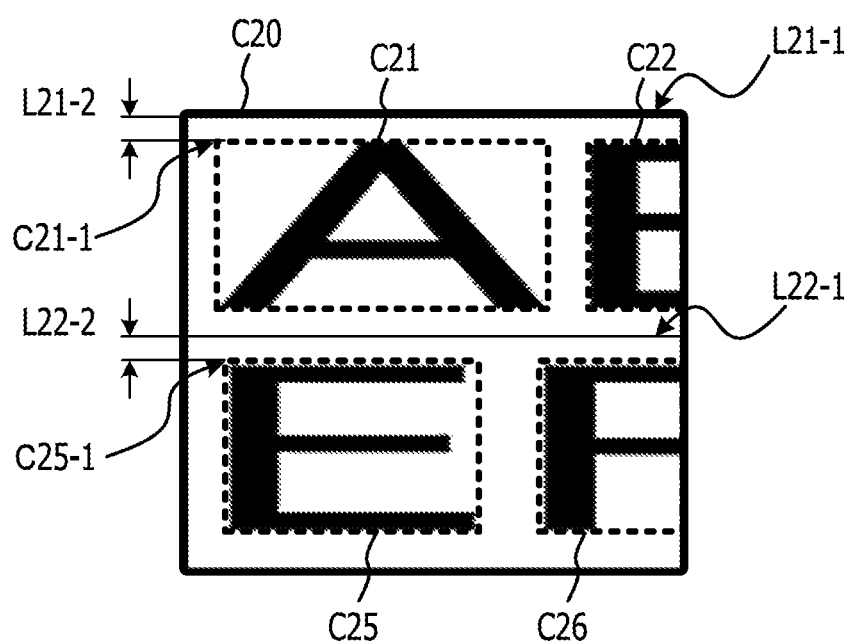
FIG. 25 is a diagram illustrating an example of a Y value difference used in a position converting process according to Example 2.

FIG. 25 is a diagram illustrating an example of the Y value difference used in a process S211 to a process S213 of the position converting process according to Example 2. In FIG. 25, for convenience of explanation, a portion of the second image data C20 is enlarged. In the example of FIG. 25, the processor 1 acquires a Y value difference L21-2 by obtaining a difference on the Y axis between an upper end Y coordinate value (first standard value) L21-1 of the first line element (character element of character "A") acquired from line area information of the second image, a character frame position C21-1 of the character frame information stored in the first character element acquired from the recognition result information. In addition, FIG. 25 illustrates a Y value difference L22-2 which is a difference on the Y axis between an upper end Y coordinate value (first standard value) L22-1 of second line element acquired from the line area information of the second image and a character frame position C25-1 of the character frame information stored in the character element of the character "E" acquired from the recognition result information. In a case of being mapped to the coordinate space on the first image, the Y value differences L21-2 and L22-2 are reduced in accordance with the scale of the first image. For this reason, in the process S212, the Y value difference is reduced by using the conversion rate such that the Y value difference is converted into the scale of the first image.

The process returns to the description of FIG. 23. The processor 1 updates the value of character frame information acquired from the character element of the recognition result information T10 in the process S205 using the converted value (S214). For example, the processor 1 updates the character frame position of the character frame information using the converted X coordinate value acquired in the process S208 and the converted Y coordinate value acquired in the process S213. In addition, the processor 1 updates the width and the height of the character frame information by using the converted width and the height acquired in the process S212. Note that, in the process S107, in a case where an enlarging process is performed in the first direction based on the conversion rate at the time of acquiring the first feature amount, the processor 1 may reduce the converted X coordinate value by using the conversion rate, and update the character frame information by using the converted X coordinate value reduced at the conversion rate.

The processor 1 determines whether or not the next character element exists in the recognition result information T10 (S215). For example, in a case where the index value of the character element to which 1 is added after the execution of the process S203 exceeds the value indicated in the element number T11 of the recognition result information, the processor 1 may determine that the next character element does not exist (NO in process S215). On the other hand, in a case where the index value of the character element to which 1 is added after the execution of the process S203 is equal to or lower than the value indicated in the element number T11 of the recognition result information, the processor 1 may determine that the next character element exists (YES in process S215).

In the process S215, in a case where it is determined that the next character element exists in the recognition result information (YES in S215), the processor 1 may execute the process after the above-described process S203. On the other hand, in the process S203, in a case where it is determined that the next character element does not exist in the recognition result information (NO in S215), the processor 1 determines whether or not the next line element exists in the line area information of the second image data (S216). For example, in a case where the index value of the line element to which 1 is added after the execution of the process S201 exceeds the value indicated in the element number T41 of the line area information, the processor 1 the processor 1 may determine that the next line element does not exist (NO in S216). On the other hand, in a case where the index value of the line element to which 1 is added after the execution of the process S201 is equal to or lower than the value indicated in the element number T41 of the line area information, the processor 1 may determine that the line element exists (YES in S216).

In the process S216, in a case where it is determined that the next line element exists in the line area information of the second image data (YES in S216), the processor 1 may execute the process after the above-described process S201. On the other hand, in the process S216, in a case where it is determined that the next line element does not exist in the line area information of the second image data (NO in S216), the processor 1 may complete the position converting process illustrated in FIG. 23. In this case, the position converting process is performed on all pieces of the character frame information stored in the recognition result information T10.

As described above, Example 2 is described. According to one aspect of Example 2, the position of the character frame stored in the character recognition result acquired from the second image to which the newline code is inserted based on the position on the second image corresponding to the newline position on the first image is mapped to the coordinate space on the first image. For this reason, it is possible to adjust the information of the character frame stored in the character recognition result to match the layout of the character pixel drawn at the first magnification while improving the accuracy of the character recognition of the document image acquired from the display result of the browser screen capture function. With this, for example, when setting the display magnification that is supposed to be generally used as first magnification and setting the display magnification larger than the first magnification as second magnification, it is possible to improve the accuracy of the character recognition for performing the character recognition by using the character pixels with high resolution which are drawn at the second magnification, and it is possible to acquire the information of the character frame having a position matched with the layout of the character pixels drawn on the browser at the generally used display magnification. The information of the character frame thus obtained is useful to notify the examiner of the character elements to be checked, for example, by displaying the character frame at a place where display mismatch is detected between browsers at the time of automating the cross-browser check. Alternatively, it is possible to provide a service that reads display contents of the browser with a synthesized voice, and it is useful to notify the user of the progress of reading, for example, by blinking the character frame corresponding to the reading position matched with the display layout on the browser.

Example 3

Figure 26:
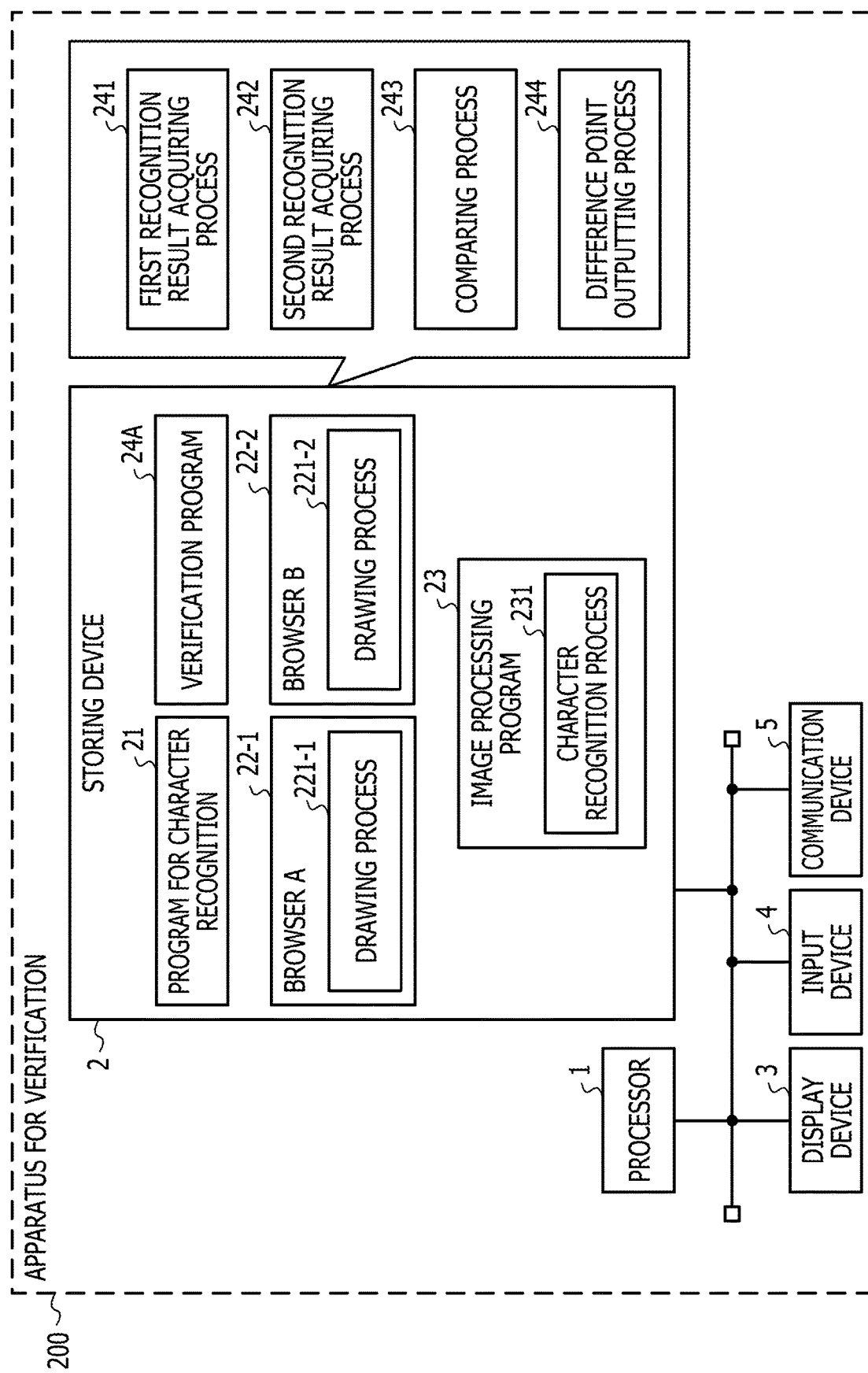
FIG. 26 is a diagram illustrating an example of a configuration of an apparatus for verification according to Example 3.

FIG. 26 is a diagram illustrating an example of an apparatus for verification 200 according to Example 3. The apparatus for verification 200 as illustrated in FIG. 26 is an apparatus that performs a cross-browser test (XBT) for detecting differences on the display between a browser A22-1 and a browser B22-2, and is one example of an apparatus to which a program for character recognition 21 according to Example 2 is applied. In the apparatus for verification 200 illustrated in FIG. 26, the same reference numerals are denoted by the same components as those of the apparatus for character recognition 100 as illustrated in FIGS. 1 and 22, and thus the description thereof will not be repeated.

Similar to the apparatus for character recognition 100 as illustrated in FIG. 1 and FIG. 22, the apparatus for verification 200 illustrated in FIG. 26 is provided with a processor 1, a storing device 2, a display device 3, an input device 4, and a communication device 5. In the storing device 2, a program for character recognition 21, a browser A22-1 and a browser B22-2 which are different kinds of browsers, an image processing program 23, and a verification program 24A are stored, and when the various kinds of programs stored in the storing device 2 are executed by the processor 1 so as to operate the apparatus for verification 200.

The browser A22-1 and the browser B22-2 are different kinds of browser programs. For example, the browser A22-1 may be a Web browser "Internet Explorer" developed by Microsoft Corporation, and the browser B22-2 may be a Web browser "Google Chrome" developed by Google Inc. Alternatively, for example, the browser A22-1 may be a version "51.02704" of a Web browser "Google Chrome" developed by Google Inc., and the browser B22-2 may be a version "27.0.1453" of a Web browser "Google Chrome" developed by Google Inc. The browser A22-1 and the browser B22-2 are programs that cause the processor 1 to operate so as to acquire HTML files from a Web server or the like, and generate an HTML document in which characters and images are drawn in accordance with the contents of the HTML file, and include a program part for causing the processor 1 to execute a drawing process 221-1 and a drawing process 221-2.

The verification program 24A is a program that causes the processor 1 to operate to detect a difference on the display between the browser A22-1 and the browser B22-2, and includes a program part for causing the processor 1 to execute a first recognition result acquiring process 241, a second recognition result acquiring process 242, a comparing process 243, a difference point outputting process 244, and the like.

The first the recognition result acquiring process 241 corresponds to a program that causes the processor 1 to execute a process that acquires a character recognition result (first recognition result) from the HTML document drawn in the drawing process 221-1 of the browser A22-1 by executing the program for character recognition 21.

The second the recognition result acquiring process 242 corresponds to a program that causes the processor 1 to execute a process that acquires a character recognition result (second recognition result) from the HTML document drawn in the drawing process 221-2 of the browser B22-2 by executing the program for character recognition 21.

The comparing process 243 corresponds to a program that causes the processor 1 to execute a process that detects a portion where the character code does not match by comparing the first recognition result with the second recognition result.

The difference point outputting process 244 corresponds to a program that causes the processor 1 to execute a process that outputs the differences detected in the comparing process 243 to the display device 3 or the like.

Figure 27:
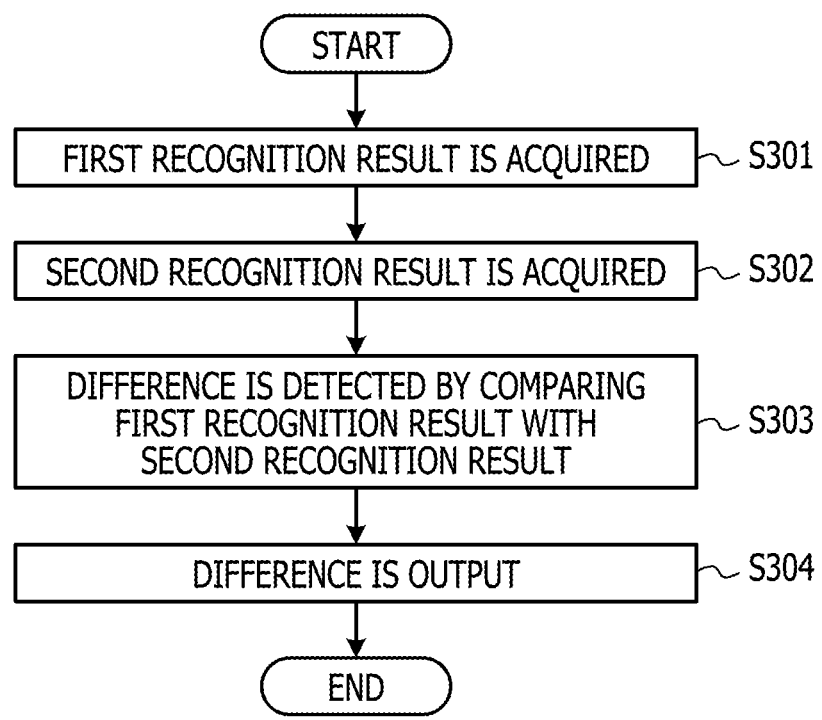
FIG. 27 is a diagram illustrating an example of the flow of a verification process according to Example 3.

FIG. 27 is a diagram illustrating an example of the flow of a verification process according to Example 3. The processor 1 of the apparatus for verification 200 according to Example 3 may start the execution of the verification process illustrated in FIG. 5, for example, when an input signal for causing the processor 1 to start the execution of the verification program 24A is supplied from the input device 4 to the processor 1 in response to a user operation.

The processor 1 acquires the first recognition result which is the result obtained by performing the character recognition from the HTML document drawn in the drawing process 221-1 of the browser A22-1 by executing the program for character recognition 21 on the browser A22-1 (S301). The first recognition result has the same data structure as that of the recognition result information T10 as illustrated in FIG. 21.

The processor 1 acquires the second recognition result which is the result obtained by performing the character recognition from the HTML document drawn in the drawing process 221-2 of the browser B22-2 by executing the program for character recognition 21 on the browser B22-2 (S302). The second recognition result has the same data structure as that of the recognition result information T10 as illustrated in FIG. 21.

The processor 1 detects a portion where the character code does not match as a difference by comparing the first recognition result with the second recognition result (S303). The processor 1 may detect character elements in which the character code does not match as a difference by comparing the character codes of the character elements of the first recognition result and the second recognition result in the index order of the character element. For example, it is assumed that the first recognition result acquired in the process S301 includes the same content as the example of the content in the recognition result information T10 as illustrated in FIG. 9, and the second recognition result acquired in the process S302 has the same content of the example of the content of the recognition result information T10 as illustrated in FIG. 21. In this case, the processor 1 detects a character element [4] and a character element [5] of the first recognition result and the second recognition result as differences by comparing the character element of the first recognition result and the character element of the second recognition result in the index order of the character element. In other words, regarding a character element [1], a character element [2], a character element [3], a character element [6], and a character element [7], the processor 1 determines that the character codes of the first recognition result and the second recognition result match with each other.

The processor 1 outputs the differences detected in the process S303 to, for example, the display device 3 (S304). As output destinations of the difference, the processor 1 may output (write) information on the difference to the storing device 2 instead of the display device 3, or to the storing device 2 together with the display device 3. The processor 1 controls (instructs) the display device 3 so as to output a difference detected in the process S303, for example, by blinking a character frame relating the difference on the display area of the browser A22-1 based on the character frame information of the character element detected as the difference from the first recognition result. The processor 1 controls (instructs) the display device 3 so as to output a difference detected in the process S303, for example, by blinking a character frame relating the difference on the display area of the browser B22-2 based on the character frame information of the character element detected as the difference from the second recognition result.

As described above, Example 3 is described. According to one aspect of Example 3, at the time of performing the character recognition on the text image acquired by using a screen capture function from the display result of the browser, when setting the display magnification that is supposed to be generally used as first magnification and setting the display magnification larger than the first magnification as second magnification, it is possible to improve the accuracy of the character recognition for performing the character recognition by using the character pixels with high resolution which are drawn at the second magnification, and it is possible to acquire a character code string having a newline made in a position matched with the layout of the character pixels drawn on the browser at the generally used display magnification. Therefore, it is possible to detect the garbled characters and detect the shift of the newline position by comparing the character recognition results acquired in this way from the different kinds of browsers.

As described above, the embodiments have been described in detail; however, the embodiments are not limited to such specific embodiments, and various modifications and changes may be made within the scope of the gist of the embodiments described in the scope of claims. For example, each step of the character recognition process and the position converting process of the present specification may not to be processed in chronological order in accordance with the order described in the flowchart, and the order of steps may be changed, or a plurality of steps may be executed in parallel within the scope of the gist of the embodiments described in the scope of claims.

The embodiment is capable of being embodied as, for example, a system, an apparatus, a method, and a program or a storage medium (recording medium). For example, the embodiment may be applied to a system including a plurality of devices, or to an apparatus including a single device.

The embodiment may be achieved by directly or remotely supplying various kinds of programs (software) for realizing the operation of the above-described embodiment to a system or an apparatus, and executing the supplied programs by a computer of the system or the apparatus. As a method for remotely supplying the programs, a computer operating as an apparatus for character recognition 100 or an apparatus for verification 200 may be connected to the server via the Internet and various kinds of programs may be downloaded from the server.

The embodiment may be applied to a dispersion system in which processes are dispersedly executed by a plurality of computers. For example, the computer operating as the first computer may execute the first image acquiring process 210 and the second image acquiring process 211 in the program for character recognition 21, and the browser 22, and the computer operating as the second computer may execute the recognition result acquiring process 212 to the newline position determining process 217 in the program for character recognition, and the image processing program 23. In this case, the first image data and the second image data are transmitted from the first computer to the second computer, and character recognition result information after the newline position is adjusted is returned from the second computer to the first computer. The process sharing in the dispersion system is not limited to this example, and may be appropriately changed. In the dispersion system as described above, the first computer is a client terminal such as a smartphone, and the second computer is a server that allows access from a plurality of client terminals, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for character recognition, comprising:
a memory; and
a processor coupled to the memory and configured to
execute a first image acquiring process that includes acquiring first image data which is an image in which string data containing one or more characters is drawn at a first display magnification through a drawing process that outputs image data acquired by drawing the one or more characters with a font size corresponding to a display magnification,
execute a second image acquiring process that includes acquiring second image data which is an image in which the string data is drawn at a second display magnification larger than the first display magnification,
execute a recognition result acquiring process that includes acquiring a character recognition result including a character code of each of the one or more characters in the string data drawn in the second image data through a character recognition process that outputs a character code corresponding to each of the one or more characters drawn in the second image data,
execute a line image acquiring process that includes acquiring one or more items of line image data including an area in which one or more characters are drawn along a first direction from each of the first image data and the second image data,
execute a first feature amount acquiring process that includes acquiring a first feature amount which is a feature amount of character pixels along the first direction from each of the one or more items of line image data acquired from the first image data,
execute a second feature amount acquiring process that includes acquiring a second feature amount which is a feature amount of character pixels along the first direction from each of the one or more items of line image data acquired from the second image data, and
execute a correspondence relationship acquiring process that includes acquiring a correspondence relationship between the character pixels of the first image data and the second image data in the first direction by comparing the first feature amount relating to the first image data with the second feature amount relating to the second image data, and execute a newline position determining process that includes specifying a position on the second image data in the first direction which corresponds to an end position in the first direction of each of the one or more items of line image data acquired from the first image data based on the correspondence relationship and adjusting, using the specified position, a newline position of the character recognition result acquired from the second image data,
wherein the correspondence relationship is based on a correspondence relationship table having lattice points indicating the correspondence relationship of coordinate values in the first direction of the line image data of the first image data and the line image data of the second image data.

2. The apparatus for character recognition according to claim 1,
wherein the processor is further configured to execute a conversion rate determining process that includes determining a conversion rate based on a ratio of the first image data to the second image data, and
wherein the first feature amount acquiring process includes acquiring the first feature amount which is a feature amount of a character pixel enlarged in the first direction and a second direction orthogonal to the first direction based on the conversion rate at the time of acquiring the first feature amount.

3. The apparatus for character recognition according to claim 2,
wherein the conversion rate determining process includes determining the conversion rate based on a ratio of the second magnification to the first magnification.

4. The apparatus for character recognition according to claim 2,
wherein the conversion rate determining process includes determining the conversion rate based on a ratio of a height of the one or more items of line image data relating to the second image data to a height of the one or more items of line image data relating to the first image data.

5. The apparatus for character recognition according to claim 2,
wherein the recognition result acquiring process includes acquiring a character frame indicating an area where character pixels of each of the characters in the string data drawn in the second image data are arranged through the character recognition process, and
wherein the processor is further configured to execute a position converting process that includes converting a position of the acquired character frame into a position on the first image data based on the correspondence relationship acquired in the correspondence relationship acquiring process, and the conversion rate acquired in the conversion rate determining process.

6. The apparatus for character recognition according to claim 1,
wherein the first feature amount acquiring process and the second feature amount acquiring process includes setting a histogram indicating a cumulative value of character pixels obtained by projecting each of the one or more items of line image data in the first direction as the feature amount.

7. A method performed by a computer for character recognition, the method comprising:
executing, by a processor of the computer, a first image acquiring process that includes acquiring first image data which is an image in which string data containing one or more characters is drawn at a first display magnification through a drawing process that outputs image data acquired by drawing the one or more characters with a font size corresponding to a display magnification, executing, by the processor of the computer, a second image acquiring process that includes acquiring second image data which is an image in which the string data is drawn at a second display magnification larger than the first display magnification through the drawing process, executing, by the processor of the computer, a recognition result acquiring process that includes acquiring a character recognition result including a character code of each of the one or more characters in the string data drawn in the second image data through a character recognition process that outputs a character code corresponding to each of the one or more characters drawn in the second image data, executing, by the processor of the computer, a line image acquiring process that includes acquiring one or more items of line image data including an area in which one or more characters are drawn along a first direction from each of the first image data and the second image data, executing, by the processor of the computer, a first feature amount acquiring process that includes acquiring a first feature amount which is a feature amount of character pixels along the first direction from each of the one or more items of line image data acquired from the first image data, executing, by the processor of the computer, a second feature amount acquiring process that includes acquiring a second feature amount which is a feature amount of character pixels along the first direction from each of the one or more items of line image data acquired from the second image data, and executing, by the processor of the computer, a correspondence relationship acquiring process that includes acquiring a correspondence relationship between the character pixels of the first image data and the second image data in the first direction by comparing the first feature amount relating to the first image data with the second feature amount relating to the second image data, and executing, by the processor of the computer, a newline position determining process that includes specifying a position on the second image data in the first direction which corresponds to an end position in the first direction of each of the one or more items of line image data acquired from the first image data based on the correspondence relationship and adjusting, using the specified position, a newline position of the character recognition result acquired from the second image data, wherein the correspondence relationship is based on a correspondence relationship table having lattice points indicating the correspondence relationship of coordinate values in the first direction of the line image data of the first image data and the line image data of the second image data.

8. The method according to claim 7, further comprising:

executing, by the processor of the computer, a conversion rate determining process that includes determining a conversion rate based on a ratio of the first image data to the second image data, and wherein the first feature amount acquiring process includes acquiring the first feature amount which is a feature amount of a character pixel enlarged in the first direction and a second direction orthogonal to the first direction based on the conversion rate at the time of acquiring the first feature amount.

9. The method according to claim 8, wherein the conversion rate determining process includes determining the conversion rate based on a ratio of the second magnification to the first magnification.

10. The method according to claim 8, wherein the conversion rate determining process includes determining the conversion rate based on a ratio of a height of the one or more items of line image data relating to the second image data to a height of the one or more items of line image data relating to the first image data.

11. The method according to claim 8, wherein the recognition result acquiring process includes acquiring a character frame indicating an area where character pixels of each of the characters in the string data drawn in the second image data are arranged through the character recognition process, and wherein the method further includes: executing, by the processor of the computer, a position converting process that includes converting a position of the character frame acquired through the recognition result acquiring process into a position on the first image data based on the correspondence relationship acquired in the correspondence relationship acquiring process, and the conversion rate acquired in the conversion rate determining process.

12. The method for character recognition according to claim 7, wherein the first feature amount acquiring process and the second feature amount acquiring process includes setting a histogram indicating a cumulative value of character pixels obtained by projecting each of the one or more items of line image data in the first direction as the feature amount.

13. A non-transitory computer-readable storage medium for storing a program for character recognition, the program causing a computer to execute a process, the process comprising:

executing a first image acquiring process that includes acquiring first image data which is an image in which string data containing one or more characters is drawn at a first display magnification through a drawing process that outputs image data acquired by drawing the one or more characters with a font size corresponding to a display magnification, executing a second image acquiring process that includes acquiring second image data which is an image in which the string data is drawn at a second display magnification larger than the first display magnification through the drawing process, executing a recognition result acquiring process that includes acquiring a character recognition result including a character code of each of the one or more characters in the string data drawn in the second image data through a character recognition process that outputs a character code corresponding to each of the one or more characters drawn in the second image data, executing a line image acquiring process that includes acquiring one or more items of line image data including an area in which one or more characters are drawn along a first direction from each of the first image data and the second image data, executing a first feature amount acquiring process that includes acquiring a first feature amount which is a feature amount of character pixels along the first direction from each of the one or more items of line image data acquired from the first image data, executing a second feature amount acquiring process that includes acquiring a second feature amount which is a feature amount of character pixels along the first direction from each of the one or more items of line image data acquired from the second image data, and executing a correspondence relationship acquiring process that includes acquiring a correspondence relationship between the character pixels of the first image data and the second image data in the first direction by comparing the first feature amount relating to the first image data with the second feature amount relating to the second image data, and executing a newline position determining process that includes specifying a position on the second image data in the first direction which corresponds to an end position in the first direction of each of the one or more items of line image data acquired from the first image data based on the correspondence relationship and adjusting, using the specified position, a newline position of the character recognition result acquired from the second image data, wherein the correspondence relationship is based on a correspondence relationship table having lattice points indicating the correspondence relationship of coordinate values in the first direction of the line image data of the first image data and the line image data of the second image data.

14. The non-transitory computer-readable storage medium according to claim 13, further comprising:

executing a conversion rate determining process that includes determining a conversion rate based on a ratio of the first image data to the second image data, and wherein the first feature amount acquiring process includes acquiring the first feature amount which is a feature amount of a character pixel enlarged in the first direction and a second direction orthogonal to the first direction based on the conversion rate at the time of acquiring the first feature amount.

15. The non-transitory computer-readable storage according to claim 14, wherein the conversion rate determining process includes determining the conversion rate based on a ratio of the second magnification to the first magnification.

16. The non-transitory computer-readable storage according to claim 14, wherein the conversion rate determining process includes determining the conversion rate based on a ratio of a height of the one or more items of line image data relating to the second image data to a height of the one or more items of line image data relating to the first image data.

17. The non-transitory computer-readable storage according to claim 14, wherein the recognition result acquiring process includes acquiring a character frame indicating an area where character pixels of each of the characters in the string data drawn in the second image data are arranged through the character recognition process, and wherein the method further includes: executing, by the processor of the computer, a position converting process that includes converting a position of the character frame acquired through the recognition result acquiring process into a position on the first image data based on the correspondence relationship acquired in the correspondence relationship acquiring process, and the conversion rate acquired in the conversion rate determining process.

* * * * *